United States Patent
Endo et al.

(10) Patent No.: US 10,699,424 B2
(45) Date of Patent: *Jun. 30, 2020

(54) IMAGE PROCESSING APPARATUS, IMAGE PROCESSING METHOD, AND NON-TRANSITORY COMPUTER READABLE MEDIUM WITH GENERATION OF DEFORMED IMAGES

(71) Applicant: CANON KABUSHIKI KAISHA, Tokyo (JP)

(72) Inventors: Takaaki Endo, Urayasu (JP); Kiyohide Satoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 265 days.

This patent is subject to a terminal disclaimer.

(21) Appl. No.: 15/648,924

(22) Filed: Jul. 13, 2017

(65) Prior Publication Data

US 2018/0025501 A1 Jan. 25, 2018

(30) Foreign Application Priority Data

Jul. 19, 2016 (JP) .................................. 2016-141220

(51) Int. Cl.
*G06K 9/32* (2006.01)
*G06T 7/32* (2017.01)
*G06T 3/00* (2006.01)

(52) U.S. Cl.
CPC ............. *G06T 7/32* (2017.01); *G06T 3/0081* (2013.01); *G06T 2207/10028* (2013.01); *G06T 2207/10072* (2013.01); *G06T 2207/20092* (2013.01); *G06T 2207/20101* (2013.01); *G06T 2207/30068* (2013.01)

(58) Field of Classification Search
None
See application file for complete search history.

(56) References Cited

U.S. PATENT DOCUMENTS

| | | | |
|---|---|---|---|
| 6,792,370 B2 | 9/2004 | Satoh et al. | |
| 6,993,450 B2 | 1/2006 | Takemoto et al. | |
| 7,092,109 B2 | 8/2006 | Satoh et al. | |
| 7,130,754 B2 | 10/2006 | Satoh et al. | |
| 7,411,594 B2 | 8/2008 | Endo et al. | |
| 7,446,768 B2 | 11/2008 | Satoh et al. | |
| 7,519,218 B2 | 4/2009 | Takemoto et al. | |

(Continued)

FOREIGN PATENT DOCUMENTS

| | | |
|---|---|---|
| JP | 2011-125570 A | 6/2011 |
| JP | 2013-000398 A | 1/2013 |

*Primary Examiner* — Randolph I Chu
(74) *Attorney, Agent, or Firm* — Venable LLP

(57) ABSTRACT

An image processing apparatus comprising: an image obtaining unit obtaining a first image and a second image different from the first image; a deformation information obtaining unit obtaining deformation information representing deformation between the first image and the second image; a deformed image generating unit generating a first deformed image of the first image deformed in accordance with the second image and a second deformed image of the second image deformed in accordance with the first image; and a display controlling unit displaying the first image, the second image, an image based on the first deformed image, and an image based on the second deformed image is used.

21 Claims, 19 Drawing Sheets

(56) References Cited

U.S. PATENT DOCUMENTS

| | | |
|---|---|---|
| 7,626,596 B2 | 12/2009 | Kotake et al. |
| 7,791,618 B2 | 9/2010 | Endo et al. |
| 7,848,903 B2 | 12/2010 | Aratani et al. |
| 8,350,897 B2 | 1/2013 | Endo et al. |
| 8,582,856 B2 | 11/2013 | Endo et al. |
| 8,730,234 B2 | 5/2014 | Izuka et al. |
| 8,917,924 B2 | 12/2014 | Endo et al. |
| 9,324,148 B2 | 4/2016 | Ishikawa et al. |
| 9,606,584 B1* | 3/2017 | Fram .................. G06F 1/1694 |
| 10,366,544 B2 | 7/2019 | Endo et al. |
| 2009/0129650 A1* | 5/2009 | Hawkes .................. G06T 7/344 |
| | | 382/131 |
| 2009/0264758 A1* | 10/2009 | Fujita .................. A61B 8/0825 |
| | | 600/443 |
| 2011/0144500 A1* | 6/2011 | Nihei .................. A61B 8/14 |
| | | 600/443 |
| 2011/0150310 A1 | 6/2011 | Endo et al. |
| 2011/0176716 A1* | 7/2011 | Kim .................. A61B 3/102 |
| | | 382/131 |
| 2011/0216958 A1* | 9/2011 | Satoh .................. G06T 7/33 |
| | | 382/131 |
| 2011/0262015 A1* | 10/2011 | Ishikawa .............. G06K 9/6206 |
| | | 382/128 |
| 2012/0321161 A1 | 12/2012 | Ishikawa et al. |
| 2013/0141462 A1* | 6/2013 | Niwa .................. G06F 3/0485 |
| | | 345/634 |
| 2014/0037176 A1 | 2/2014 | Endo et al. |
| 2015/0015572 A1* | 1/2015 | Izumo .................. A61B 5/743 |
| | | 345/419 |
| 2015/0070469 A1 | 3/2015 | Yoshibayashi et al. |
| 2015/0145966 A1* | 5/2015 | Krieger .................. G06T 17/20 |
| | | 348/47 |
| 2015/0209013 A1* | 7/2015 | Tsymbalenko .......... A61B 8/485 |
| | | 600/440 |
| 2015/0363907 A1* | 12/2015 | Satoh .................. G06T 7/30 |
| | | 382/289 |
| 2016/0027179 A1 | 1/2016 | Takama et al. |
| 2016/0042248 A1 | 2/2016 | Endo et al. |
| 2016/0063695 A1* | 3/2016 | Lee .................. G06T 15/08 |
| | | 382/131 |
| 2016/0180527 A1* | 6/2016 | Endo .................. G06T 7/60 |
| | | 382/190 |
| 2017/0010788 A1* | 1/2017 | Srinivasaraghavan ................ H04N 21/4828 |
| 2017/0039776 A1 | 2/2017 | Endo et al. |
| 2017/0090724 A1* | 3/2017 | Young .................. G06F 3/03543 |
| 2018/0025548 A1 | 1/2018 | Endo et al. |
| 2018/0064422 A1* | 3/2018 | Otomaru .................. G06T 7/74 |
| 2019/0311549 A1* | 10/2019 | Endo .................. G06T 7/149 |

\* cited by examiner

IMAGE PROCESSING APPARATUS, IMAGE PROCESSING METHOD, AND NON-TRANSITORY COMPUTER READABLE MEDIUM WITH GENERATION OF DEFORMED IMAGES

BACKGROUND OF THE INVENTION

Field of the Invention

The present invention relates to an image processing apparatus, an image processing method, and a non-transitory computer readable medium.

Description of the Related Art

In the field of medicine, a doctor, a technologist, or the like may compare a plurality of images to each other. The plurality of images are, e.g., images captured using different imaging devices (hereinafter referred to as modalities) or different imaging parameters, captured at different times, or showing an object in different body postures. In some cases, the shape of the object differs from image to image. When the object is, e.g., a living body, it is difficult for a plurality of modalities to capture images in which the object is completely consistent in body position and shape.

Even in such a case, to more precisely compare affected areas to each other, it may be possible to perform registration between different images and simultaneously or switchably display both or each of the images at a time. Alternatively, it may also be possible to display a differential image between the images. There is a method referred to as deformable registration which estimates the deformation of an object observed in a plurality of images and deforms one of the images to generate an image in which the object has a shape similar to that of the object in another of the images. The process of the deformable registration can be performed by, e.g., associating corresponding positions (characteristic points showing the same part of the object) in the plurality of images with each other on the basis of the degree of image similarity between localized regions.

Japanese Patent Application Laid-open No. 2013-000398 discloses that a three-dimensional image and a two-dimensional tomographic image are subjected to deformable registration and the two images are simultaneously displayed or each of the images is switchably displayed at a time. On the other hand, Japanese Patent Application Laid-open No. 2011-125570 discloses a method of generating a cross-sectional image in accordance with the deformed state of an object.

Patent Literature 1: Japanese Patent Application Laid-open No. 2013-000398
Patent Literature 2: Japanese Patent Application Laid-open No. 2011-125570

SUMMARY OF THE INVENTION

However, in accordance with the display method described in Japanese Patent Application Laid-open No. 2013-000398, it may be sometimes difficult to make a comparison between images. In particular, when three-dimensional images are compared to each other, it may be difficult to recognize the corresponding positions in the individual images and the correspondence relationship therebetween.

The present invention has been achieved in view of the foregoing problem. An object of the present invention is to provide a technique for successfully comparing a plurality of object images to each other.

The present invention provides an image processing apparatus comprising:
an image obtaining unit configured to obtain a first image and a second image different from the first image;
a deformation information obtaining unit configured to obtain deformation information representing deformation between the first image and the second image;
a deformed image generating unit configured to generate a first deformed image of the first image deformed in accordance with the second image and a second deformed image of the second image deformed in accordance with the first image, on the basis of the deformation information; and
a display controlling unit configured to control display, on a displaying unit, the first image, the second image, an image based on the first deformed image, and an image based on the second deformed image.

The present invention also provides an image processing method comprising:
a step of obtaining a first image and a second image different from the first image;
a step of obtaining deformation information representing deformation between the first image and the second image;
a step of generating a first deformed image of the first image deformed in accordance with the second image and a second deformed image of the second image deformed in accordance with the first image, on the basis of the deformation information; and
a step of controlling display of the first image, the second image, an image based on the first deformed image, and an image based on the second deformed image.

The present invention also provides a non-transitory computer readable medium storing a program causing a computer to execute an image processing method, the method comprising:
a step of obtaining a first image and a second image different from the first image;
a step of obtaining deformation information representing deformation between the first image and the second image;
a step of generating a first deformed image of the first image deformed in accordance with the second image and a second deformed image of the second image deformed in accordance with the first image, on the basis of the deformation information; and
a step of controlling display of the first image, the second image, an image based on the first deformed image, and an image based on the second deformed image.

The present invention also provides an image processing apparatus comprising:
an image obtaining unit configured to obtain a plurality of images different from each other;
a deformation information obtaining unit configured to obtain deformation information representing deformation between the plurality of images;
a deformed image generating unit configured to generate a plurality of deformed images of the respective plurality of images deformed in accordance with other images, based on the deformation information; and
a display controlling unit configured to control display, on a displaying unit, of the plurality of images and an image based on the plurality of deformed images.

According to the present invention, it is possible to provide a technique for successfully comparing a plurality of images to each other.

Further features of the present invention will become apparent from the following description of exemplary embodiments with reference to the attached drawings.

DESCRIPTION OF THE EMBODIMENTS

Figure 1:
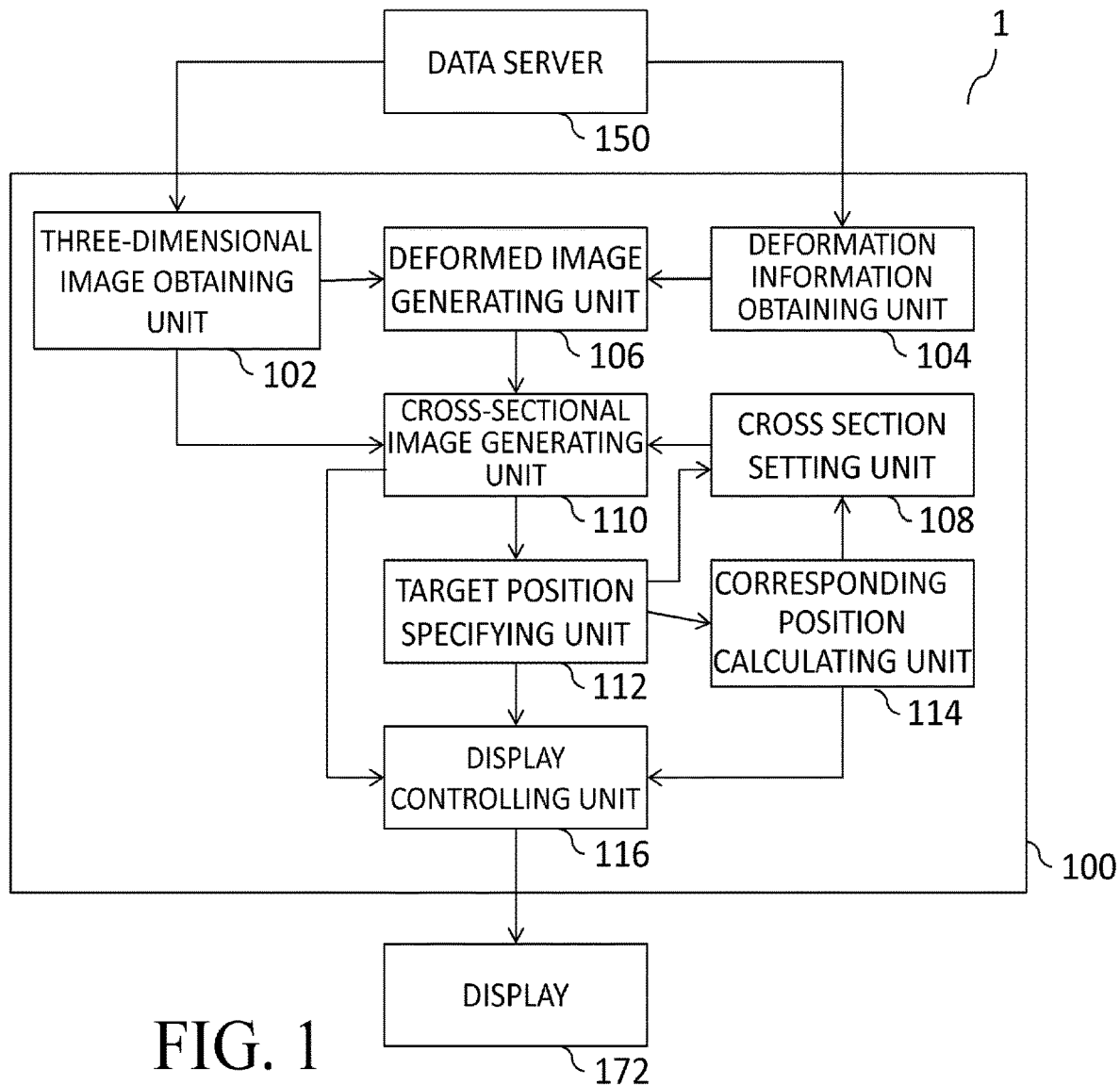
FIG. 1 is a view showing an example of a functional configuration of an image processing apparatus according to Embodiment 1.

Referring now to the drawings, the following will describe preferred embodiments of the present invention. However, the dimensions, materials, and shapes of components described below, relative positioning thereof, and the like are to be appropriately changed in accordance with a configuration of an apparatus to which the invention is applied and various conditions and are not intended to limit the scope of the invention to the following description.

The present invention relates to a technique which images an object to form an image of a target region in the object and displays the formed image. Accordingly, the present invention is regarded as an image processing apparatus or an image processing system, a control method therefor, an image processing method, a signal processing method, or an information processing method. The present invention is also regarded as an object information obtaining apparatus, a control method therefor, or an object information obtaining method. The present invention is also regarded as a program for causing an information processing apparatus including hardware resources, such as a CPU and a memory, to implement each of the methods mentioned above or a non-transitory storage medium which is readable by a computer storing therein the program.

An apparatus according to the present invention may have the function of obtaining image data of an object or only the function of processing image data obtained by another apparatus. The image data of the object is obtained as a distribution of two-dimensional or three-dimensional characteristic information on the basis of the characteristic information of each of positions. The characteristic information may also be obtained not as numerical data, but as information on a distribution of the individual positions in the object.

As a data source for a three-dimensional image of a target subject to be processed in the present invention, various modalities can be used. Examples of the various modalities include a photoacoustic tomographic apparatus (PAT), a nuclear magnetic resonance imaging apparatus (MRI), an X-ray computed tomographic apparatus (CT), an ultrasonographic apparatus (US), a positron emission tomographic apparatus (PET), a single photon emission tomographic apparatus (SPECT), and an optical coherent tomographic apparatus (OCT). By capturing images using each of the modalities, image data showing information on a distribution of characteristic information in accordance with each of the modalities in a three-dimensional region in the object can be obtained.

The present invention is typically used when image data obtained by the photoacoustic tomographic apparatus is compared to image data obtained by the nuclear magnetic resonance imaging apparatus. The photoacoustic tomographic apparatus receives an acoustic wave generated in the object by irradiating the object with light and obtains the characteristic information of the object as image data. As the characteristic information, an initial sound pressure, a light absorption coefficient, the concentration of a component material, the degree of oxygen saturation, or the like in the object can be obtained. The nuclear magnetic resonance imaging apparatus uses the phenomenon of nuclear magnetic resonance caused by giving a high-frequency magnetic field to the object to image the inside of the object. The nuclear magnetic resonance imaging apparatus can mainly visualize information related to hydrogen in the object. However, a combination of modalities is not limited thereto.

In the following description, as an example of the object, a breast is used. However, the object in the present invention is not limited thereto. Another part of a living body such as a hand, a leg, or a trunk, an animal other than a human being such as a mouse, a deformable non-living material, or the like can also serve as a target object to be imaged.

Embodiment 1

In Embodiment 1, a description will be given of an example in which a first three-dimensional image obtained by imaging an object, a first deformed image obtained by deforming the first three-dimensional image in accordance with a second three-dimensional image, the second three-dimensional image, and a second deformed image obtained by deforming the second three-dimensional image in accordance with the first three-dimensional image are displayed in an arrangement. Note that, in Embodiment 1, it is assumed that calculation (deformation estimation) for subjecting the first three-dimensional image to deformable registration such that the position and shape thereof match those of the second three-dimensional image has been performed in advance and deformation information (a deformation parameter) representing deformation between the first and second three-dimensional images has been obtained in advance. Note that examples of the first and second three-dimensional images in the present embodiment include images obtained by imaging the same object using a plurality of modalities and images obtained by imaging the same object using the same modality at different times.

Here, any image may be used as the first three-dimensional image and the second three-dimensional image may be used if the purpose is the deformable registration and observation of the first three-dimensional image and the second three-dimensional image. The first three-dimensional image and the second three-dimensional image are not limited to images captured by imaging the same object. For example, it is permissible to make the image of the object being observed the first three-dimensional image, and to make the image of the normal patient to be compared with it as the second three-dimensional image. Moreover, it is permissible to use a standard image or an artificial image which were generated from three-dimensional images of a plurality of objects.

(Apparatus Configuration)

FIG. 1 shows an example of a functional configuration of the image processing apparatus 100 according to Embodiment 1. An image processing system 1 in Embodiment 1 includes the image processing apparatus 100, a data server 150, and a display 172.

The data server 150 holds the first and second three-dimensional images of the object. It is to be noted herein that imaging for obtaining the first three-dimensional image and imaging for obtaining the second three-dimensional image are different in terms of imaging time, modality, the degree of deformation, or the like. For example, for a follow-up purpose, the second three-dimensional image may also be obtained using the same modality as used to obtain the first three-dimensional image after a given time period. For example, to make a diagnosis from a multi-phasic viewpoint, the same object may also be imaged on the same day using different modalities. For example, to obtain images at a plurality of depths, imaging may also be performed a plurality of times in different pressed states.

The data server 150 holds the deformation information representing deformation between the first and second three-dimensional images. The deformation information in Embodiment 1 is information on a deformation field including displacement vectors from the positions of the individual unit regions of the second three-dimensional image to the corresponding positions on the first three-dimensional image. Note that, when the present invention is applied to a three-dimensional image as in the present embodiment, the unit regions are voxels. The following will describe such a case. On the other hand, when the present invention is applied to a two-dimensional image, the unit regions are pixels.

Note that each of the three-dimensional images includes, as related information, the size and definition of the image, the type of the modality used to image the three-dimensional image, imaging information, medical case information, inter-image correspondence information, and the like. The imaging information is information showing, e.g., an imaging parameter for the three-dimensional image, the imaged portion thereof, the body posture thereof, and the like. Examples of the medical case information include patient information, test information, diagnosis information, organ region information, and region-of-concern information. As necessary, such related information is transmitted together with the three-dimensional image to the image processing apparatus 100.

The image processing apparatus 100 includes a three-dimensional image obtaining unit 102, a deformation information obtaining unit 104, a deformed image generating unit 106, a cross section setting unit 108, a cross-sectional image generating unit 110, a target position specifying unit 112, a corresponding position calculating unit 114, and a display controlling unit 116.

The three-dimensional image obtaining unit 102 obtains the first and second three-dimensional images of the object from the data server 150.

The deformation information obtaining unit 104 obtains the deformation information representing deformation between the first and second three-dimensional images from the data server 150.

The deformed image generating unit 106 deforms the first three-dimensional image using the obtained deformation information such that the position and shape thereof match those of the second three-dimensional image to generate the first deformed image. The deformed image generating unit 106 also deforms the second three-dimensional image using the obtained deformation information such that the position and shape thereof match those of the first three-dimensional image to generate the second deformed image.

The cross section setting unit 108 sets respective cross sections into which the first and second three-dimensional images and the first and second deformed images are to be cut.

The cross-sectional image generating unit 110 generates cross-sectional images in the set cross sections from the first and second three-dimensional images and the first and second deformed images. The respective cross-sectional images generated from the first and second three-dimensional images can be referred to as first and second cross-sectional images. The respective cross-sectional images generated from the first and second deformed images can be referred to as first and second deformed cross-sectional images.

The target position specifying unit 112 specifies a target position on the cross-sectional image of the second three-dimensional image on the basis of the information input by a user's operation. A user can perform such an input operation using an operation unit 1709 shown in FIG. 17.

The corresponding position calculating unit 114 calculates a corresponding position on the first three-dimensional image which corresponds to the target position on the cross-sectional image of the second three-dimensional image.

The display controlling unit 116 performs control for displaying the respective cross-sectional images of the first and second three-dimensional images and the first and second deformed images and a screen for reporting other information to the user on the display 172 serving as a displaying unit.

(Hardware Configuration)

Figure 17:
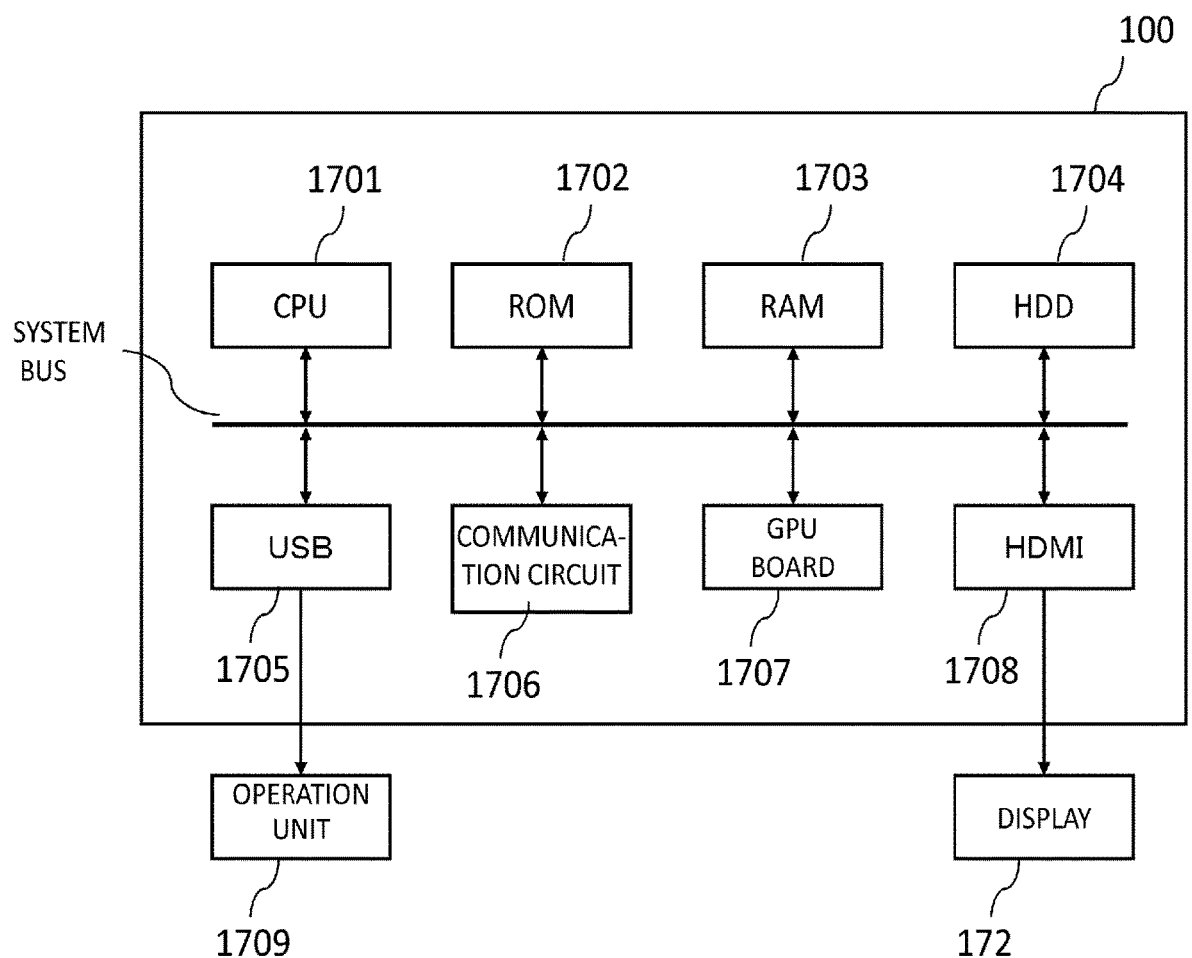
FIG. 17 is a view showing an example of a hardware configuration of the image processing apparatus according to Embodiments.

FIG. 17 shows an example of a hardware configuration of the image processing apparatus 100. The image processing apparatus 100 includes a CPU 1701, a ROM 1702, a RAM 1703, an HDD 1704, a USB 1705, a communication circuit 1706, a GPU board 1707, and an HDMI 1708. These components are connected by an internal bus to be communicative with each other.

The central processing unit (CPU) 1701 is a control circuit which synthetically controls the image processing apparatus 100 and the individual units connected thereto. The CPU 1701 performs the control by executing the program stored in the ROM 1702. The CPU 1701 also executes a display driver as software for controlling the display 172 serving as the displaying unit to perform display control on the display 172. The CPU 1701 also performs input/output control on the operation unit 1709.

The read only memory (ROM) 1702 stores a program in which the procedure of the control by the CPU 1701 is stored as well as data.

The random access memory (RAM) 1703 is a memory storing programs for performing processes in the image processing apparatus 100 and in the individual units connected thereto and various parameters used in image processing. The RAM 1703 stores a control program to be executed by the CPU 1701 and temporarily stores various data when the CPU 1701 performs various control.

The hard disk drive (HDD) 1704 is an auxiliary storage device which stores various data such as X-ray image data.

The universal serial bus (USB) 1705 is connected to the operation unit 1709. As the operation unit 1709, a mouse, a keyboard, or the like can be used.

The communication circuit 1706 is a circuit for performing communication with each of the components included in the image processing system 1. The communication circuit 1706 may include a plurality of components in accordance with an intended communication form.

The GPU board 1707 is a versatile graphics board including a GPU and a video memory. The provision of the GPU board 1707 allows high-speed arithmetic operations for image processing and image display to be performed without need for dedicated hardware. In the configuration in Embodiment 1, the deformed images and an error image are obtained from the data server 150. Accordingly, the image processing apparatus 100 need not include the GPU board 1707.

The high definition multimedia interface (registered trademark) (HDMI) 1708 is connected to the display 172 serving as the displaying unit.

The data server 150 can be formed of an information processing apparatus which has a CPU and a memory and operates in accordance with a program, similarly to the image processing apparatus 100. Note that the image processing apparatus 100 may also receive the three-dimensional images from a real modality such as a photoacoustic tomographic apparatus or a nuclear magnetic resonance imaging apparatus, not from the data server 150. The data server 150 and the image processing apparatus may also be formed of physically the same information processing apparatus.

As the display 172, any display device such as a liquid crystal display or an organic EL display can be used. By using a touch panel, the display 172 can serve also as the operation unit 1709.

(Process Flow)

Figure 2:
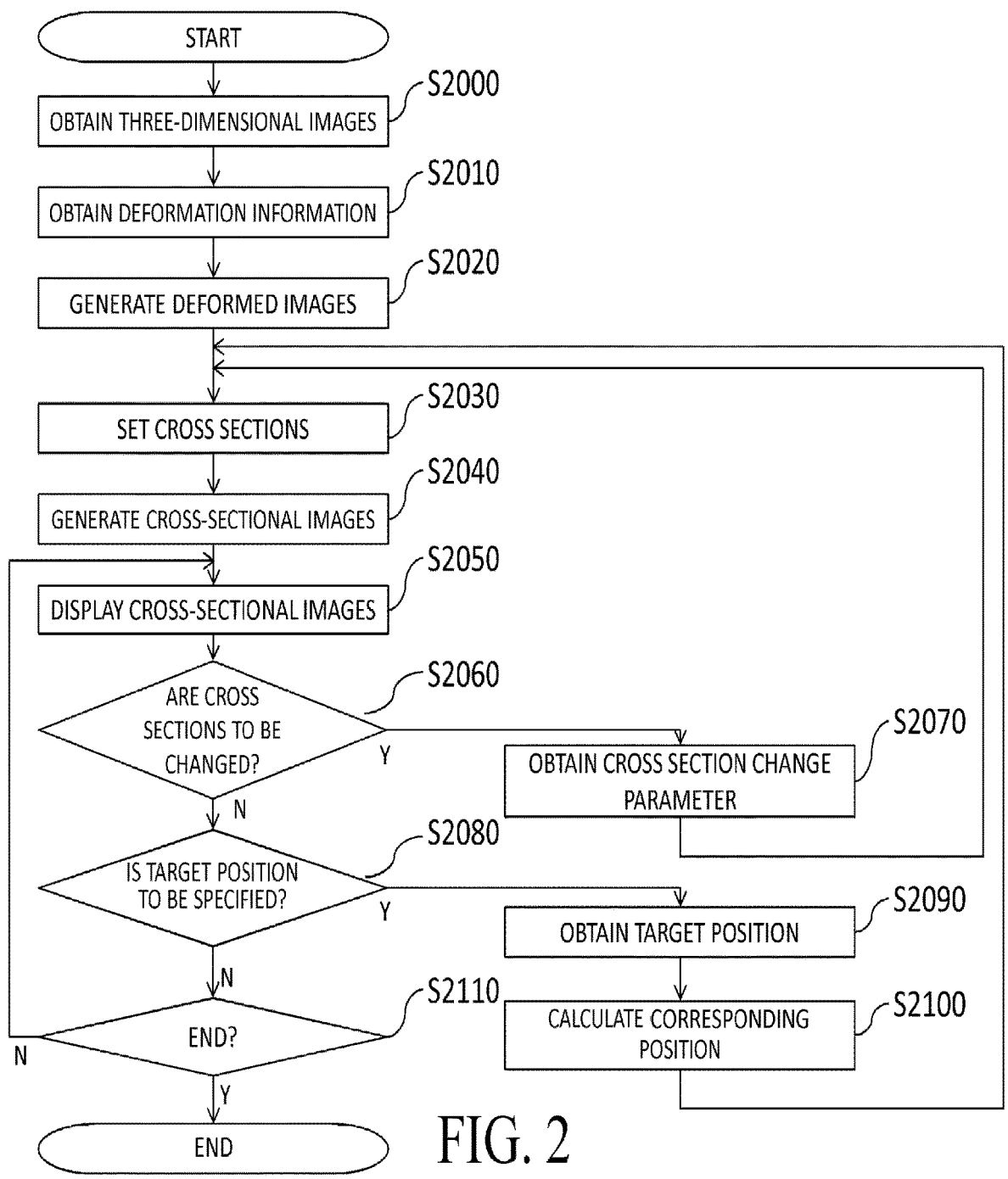
FIG. 2 is a flow chart showing an example of a process according to Embodiment 1.

FIG. 2 is a flow chart showing an example of a process performed by the image processing apparatus 100. By performing the process shown in FIG. 2, the image processing apparatus 100 displays the first and second three-dimensional images and the first and second deformed images which are arranged in the form of tiles.

In Step S2000, the three-dimensional image obtaining unit 102 obtains each of the three-dimensional images of the object from the data server 150. Then, the three-dimensional image obtaining unit 102 transmits the obtained images to each of the deformed image generating unit 106 and the cross-sectional image generating unit 110.

In Step S2010, the deformation information obtaining unit 104 obtains the deformation information representing deformation between the three-dimensional images from the data server 150. In Embodiment 1, the deformation information obtaining unit 104 obtains the information on the deformation field including the displacement vectors from the positions of the individual voxels of the second three-dimensional image to corresponding positions on the first three-dimensional image. Then, the deformation information obtaining unit 104 transmits the obtained deformation information to the deformed image generating unit 106.

In Step S2020, the deformed image generating unit 106 generates the first deformed image by deforming the first three-dimensional image using the deformation information obtained in Step S2010 such that the position and shape thereof match those of the second three-dimensional image. The deformed image generating unit 106 also generates the second deformed image by deforming the second three-dimensional image such that the position and shape thereof match those of the first three-dimensional image. Then, the deformed image generating unit 106 transmits the generated first and second deformed images to the cross-sectional image generating unit 110.

In the generation of the first deformed image in which the first three-dimensional image is deformed to generate the second three-dimensional image, the deformation information representing the deformation from the second three-dimensional image to the first three-dimensional image is information on reverse deformation. The process of obtaining the value of each of the voxels of the first deformed image from the first three-dimensional image is implemented by performing calculation to determine the voxel of the first three-dimensional image from which the value is to be obtained on the basis of the reverse deformation.

On the other hand, in the generation of the second deformed image in which the second three-dimensional image is deformed to generate the first three-dimensional image, the deformation information representing the deformation from the second three-dimensional image to the first three-dimensional image is information on forward deformation. Accordingly, the deformed image generating unit 106 generates reverse deformation information representing the deformation from the first three-dimensional image to the second three-dimensional image from the deformation information obtained in Step S2010. Then, the deformed image generating unit 106 generates the second deformed image using the reverse deformation information. Specifically, the deformed image generating unit 106 exploratively calculates a displacement vector from the position of each of the voxels of the first three-dimensional images to a corresponding position on the second three-dimensional image on the basis of the information on the deformation field obtained in Step S2010. The result of calculating the displacement vectors for the positions of all the voxels serves as information on a reverse deformation field, i.e., reverse deformation information.

In Step S2030, the cross section setting unit 108 sets respective cross sections into which the three-dimensional images obtained in Step S2000 are to be cut and respective cross sections into which the deformed images generated in Step S2020 are to be cut. Then, the cross section setting unit 108 transmits information on each of the set cross sections to the cross-sectional image generating unit 110.

In the initial state, e.g., axial cross sections passing through the respective centers of the individual three-dimensional images are set. On the other hand, when there is a transition from Step S2070 described later to this process step, new cross sections are set by applying the cross section change parameter set in Step S2070 to the individual cross sections after the previously performed process in Step S2030.

When there is a transition from Step S2100 described later to this process step, respective cross sections into which the first three-dimensional image and the second deformed image are to be cut that include the corresponding position calculated in Step S2100 are set. The orientations of the cross sections are set on the basis of information showing the orientations of the cross sections set in Step S2070. Note that, when there is a transition from Step S2100 to this process step, respective cross sections into which the second three-dimensional image and the first deformed image are to be cut need not be changed.

In Step S2040, the cross-sectional image generating unit 110 cuts the cross sections set in Step S2030 out of the respective three-dimensional images obtained in Step S2000 and the respective deformed images generated in Step S2020 to form the respective cross-sectional images thereof. Then, the cross-sectional image generating unit 110 transmits each of the generated cross-sectional images to each of the target position specifying unit 112 and the display controlling unit 116.

Figure 3:
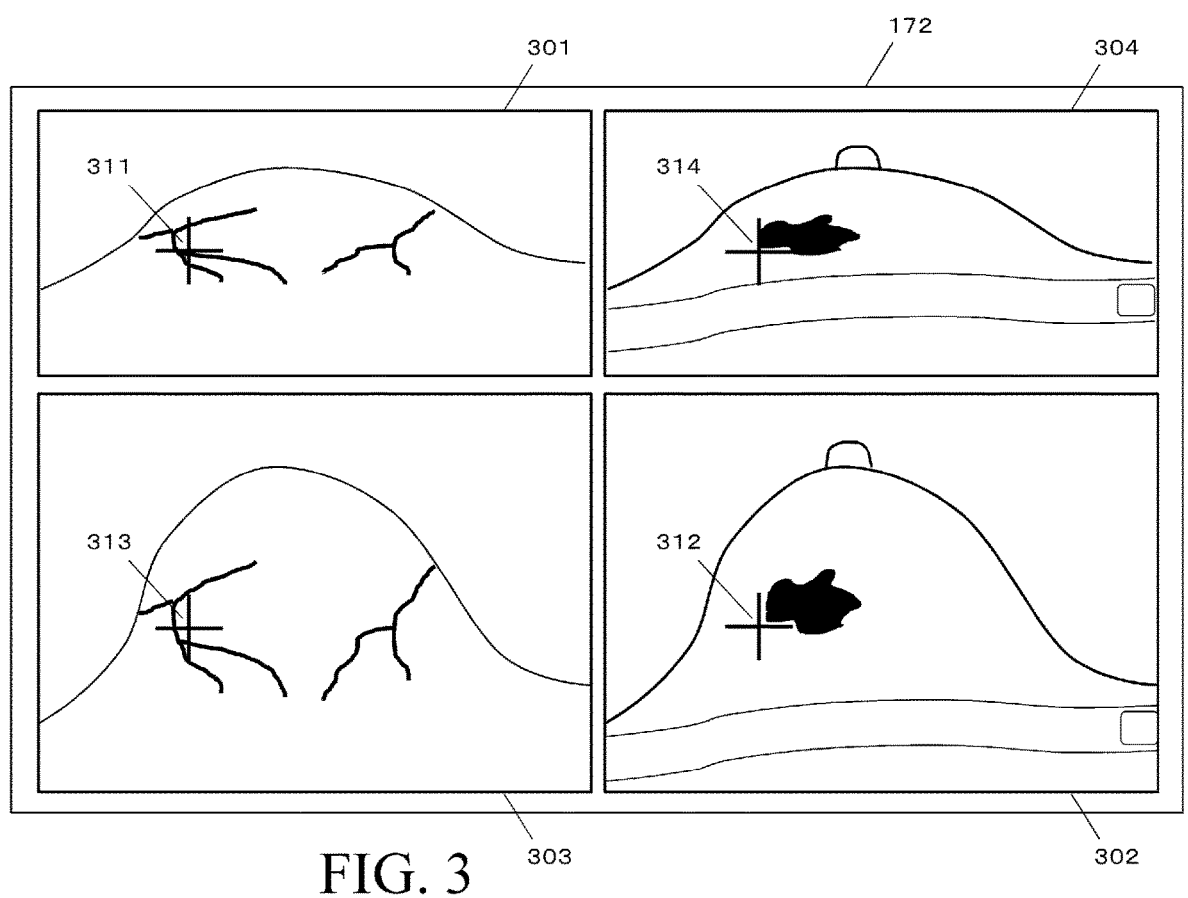
FIG. 3 is a view showing an example of a screen displayed by the image processing apparatus according to Embodiment 1.

In Step S2050, the display controlling unit 116 performs control for displaying each of the cross-sectional images generated in Step S2040 on the display 172. In the present embodiment, the individual cross-sectional images are arranged in the form of tiles in a 2×2 configuration. At this time, the respective cross-sectional images of the first and second three-dimensional images are arranged to be located on a diagonal line (at an upper left position and a lower right position or at a lower left position and an upper right position). Then, the first and second deformed images are disposed at the other remaining positions. At this time, the respective positions of the first and second deformed images are determined in accordance with information on the orientations of the cross sections and information on the direction of main deformation. For example, when the direction of main deformation observed between the images is a direction from a nipple to a greater pectoral muscle and when the axial cross-sections are displayed, the first deformed cross-sectional image is disposed in the same column as that (at an upper or lower position) of the first cross-sectional image, while the second deformed cross-sectional image is disposed in the same column as that of the second cross-sectional image. That is, when the first cross-sectional image is disposed at an upper left position, the first deformed cross-sectional image is disposed at a lower left position (under the first cross-sectional image), while the second deformed cross-sectional image is disposed at an upper right position (over the second cross-sectional image) (FIG. 3). On the other hand, when the sagittal cross sections of the same image are displayed, the first deformed cross-sectional image is disposed in the same row as that (on the right or left) of the first cross-sectional image, while the second deformed cross-sectional image is disposed in the same row as that of the second cross-sectional image. That is, when the first cross-sectional image is disposed at an upper left position, the first deformed cross-sectional image is disposed at an upper right position (on the right of the first cross-sectional image), while the second deformed cross-sectional image is disposed at a lower left position (on the left of the second cross-sectional image) (FIG. 4).

FIG. 3 shows an example of a cross-sectional image 301 of the first three-dimensional image of the object, a cross-sectional image 302 of the second three-dimensional image of the object, a cross-sectional image 303 of the first deformed image, and a cross-sectional image 304 of the second deformed image, which are displayed on the display 172. FIG. 3 shows the case where the object is a breast, the orientations of the cross sections are those of the axial cross sections, and the direction of main deformation is the direction from the nipple to the greater pectoral muscle. It is assumed herein that the information on the direction of main deformation is held in advance as one of the deformation information items in the data server 150.

In Embodiment 1, the individual cross-sectional images are arranged in the form of tiles such that the cross-sectional image 301 of the first three-dimensional image and the cross-sectional image 302 of the second three-dimensional image are located on a diagonal line. In the example of FIG. 3, the first cross-sectional image 301 is disposed at the upper left position and the second cross-sectional image 302 is disposed at the lower right position diagonal to the position of the first cross-sectional image 301. On the other hand, the first deformed cross-sectional image 303 is disposed at the lower left position and the second deformed cross-sectional image 304 is disposed at the upper right position. When the target position has been specified in Step S2090 described later and the corresponding position has been calculated in Step S2100, the respective display positions of the cross-sectional images are preferably adjusted such that the target position coincides with the corresponding position on the display 172. That is, in FIG. 3, the adjustment is made such that a position 313 on the first deformed cross-sectional image 303, which shows the same position as a target position 312 on the second cross-sectional image, coincides with a corresponding position 311 on the first cross-sectional image 301 in a lateral direction. Also, the adjustment is preferably made such that a position 314 on the second deformed cross-sectional image 304, which shows the same position as the corresponding position 311 on the first cross-sectional image 301, coincides with the target position 312 on the second cross-sectional image 302 in the lateral direction.

Figure 4:
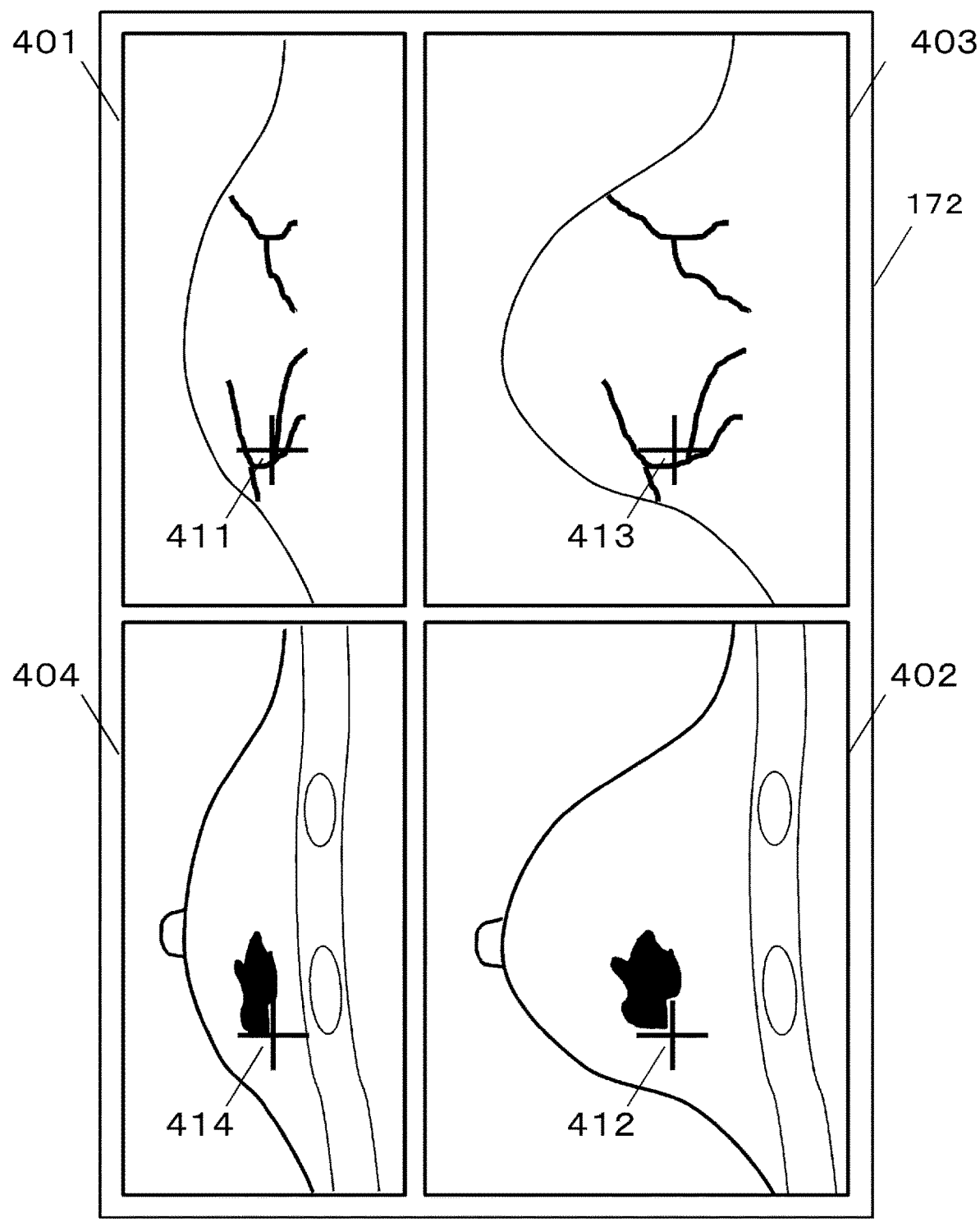
FIG. 4 is a view showing an example of the screen displayed by the image processing apparatus according to Embodiment 1.

In the case where information showing that the orientations of the cross sections are those of the sagittal cross sections is obtained in Step S2070 described later, as shown in FIG. 4, the respective locations of a cross-sectional image 403 of the first deformed image and a cross-sectional image 404 of the second deformed image are preferably switched to each other.

Figure 5:
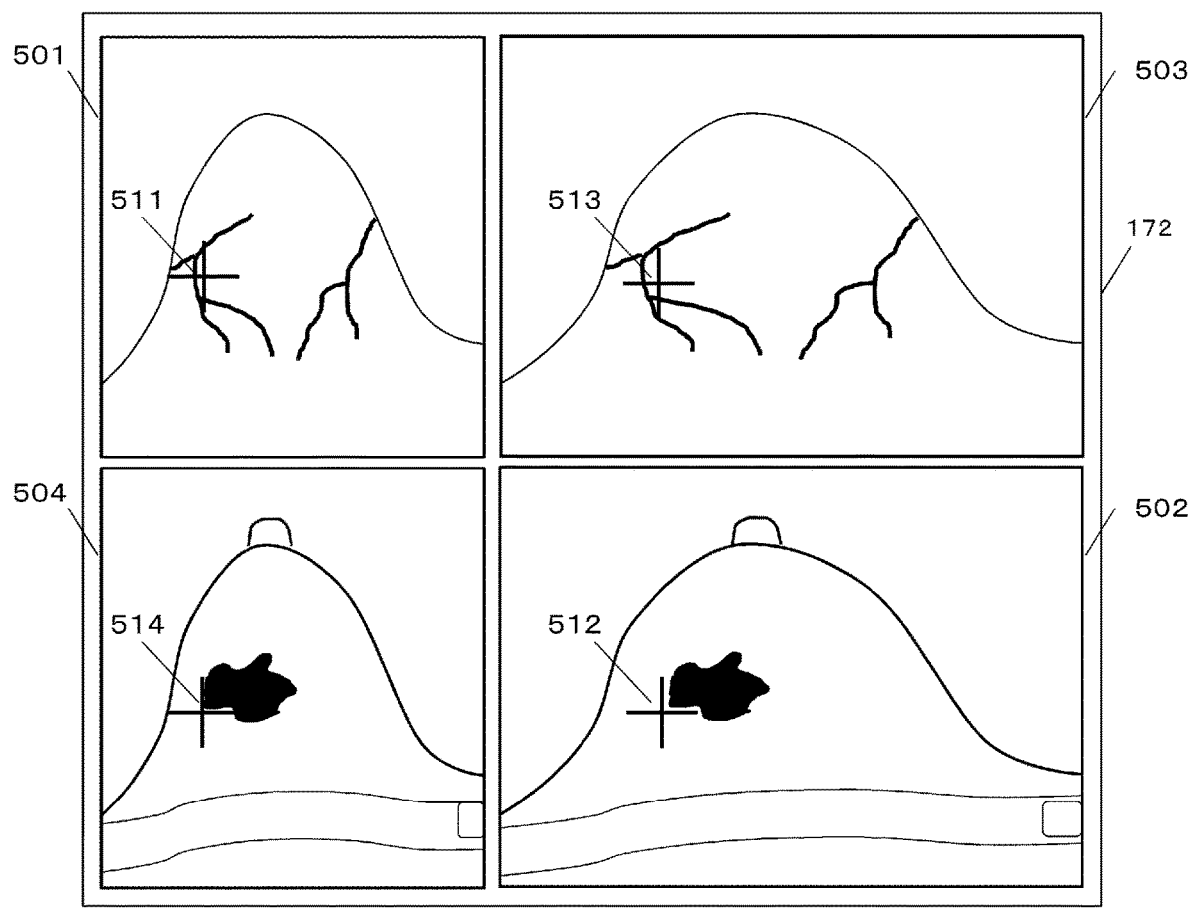
FIG. 5 is a view showing an example of the screen displayed by the image processing apparatus according to Embodiment 1.

Even in the case where information showing that the orientations of the cross-sections are those of the axial cross sections is obtained also, when the direction of main deformation is the lateral direction of the breast, as shown in FIG. 5, the respective locations of a cross-sectional image 503 of the first deformed image and a cross-sectional image 504 of the second deformed image are preferably switched to each other.

Figure 6:
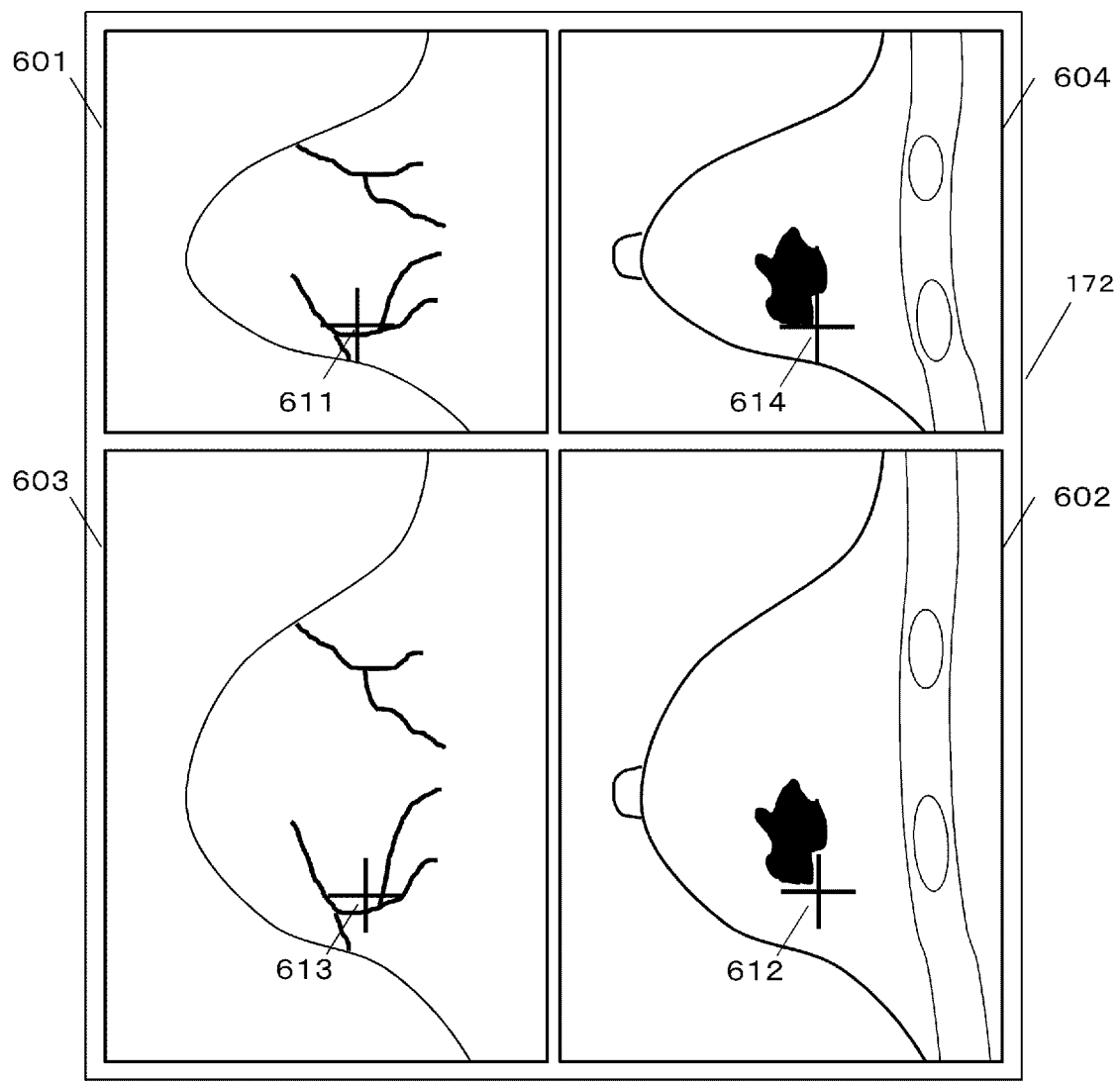
FIG. 6 is a view showing an example of the screen displayed by the image processing apparatus according to Embodiment 1.

Note that the layout of the screen when the orientations of the cross sections are those of the sagittal cross sections and the direction of main deformation is the lateral direction of the breast is preferably the same as that in the case where the orientations of the cross sections are those of the axial cross sections and the direction of main deformation is the direction from the nipple to the greater pectoral muscle, as shown in FIG. 6. In such cases also, the respective display positions of the cross-sectional images are preferably adjusted such that the target position coincides with the corresponding position on the display 172.

In Step S2060, the image processing apparatus 100 determines whether or not to change the cross section of each of the three-dimensional images. For example, the result of the determination about the change is input on the basis of whether or not the user has performed a predetermined operation associated with the changing of the cross section using the operation unit 1709. A specific example of the predetermined operation associated with the changing of the cross section will be shown in the description of Step S2070. When an input indicative of the change is received, the process is advanced to Step S2070. On the other hand, when the input indicative of the change is not received, the process is advanced to Step S2080.

In Step S2070, the cross section setting unit 108 sets a cross section change parameter in accordance with the operation performed by the user using the operation unit 1709 and transmits the set cross section change parameter to the cross-sectional image generating unit 110. Then, the process is returned to Step S2030.

In Embodiment 1, as the cross section change parameter, a movement amount L by which the position of each of the cross sections is moved in a direction normal to the cross section is set. For example, when the "f" key is pressed, the movement amount L=1 mm is set. When the "b" key is pressed, the movement amount L=−1 mm is set. Alternatively, as the cross section change parameter, information showing the orientation of each of the cross sections is set. For example, when the "a" key is pressed, information showing that each of the cross sections is an axial cross section is set. When the "s" key is pressed, information showing that each of the cross sections is a sagittal cross section is set. When the "c" key is pressed, information showing that each of the cross sections is a coronal cross section is set.

Note that the cross section change parameter is not limited to the movement amount L or orientation of each of the cross sections. As the cross section change parameter, information on a rotation axis, rotation angle, or the like for the rotation of each of the cross sections may also be set. Alternatively, the thickness (hereinafter referred to as the slab thickness) of each of the cross sections may also be set as the cross section change parameter. The cross section change parameter may also be set in response not to the pressing of a predetermined key, but to an operation of moving a mouse, an operation of rotating a mouse wheel, or the like.

Note that the updating of the cross sections may be performed simultaneously (in association) for all the images or may also be individually performed. It may also be possible to update only the cross sections of the images aligned with each other (i.e., the first three-dimensional image and the second deformed image, and the second three-dimensional image and the first deformed image). It may also be possible that, when the cross section of a given image of concern is updated, the cross section of each of the other images which corresponds (is closest) to the updated cross section is calculated and updated. At this time, the calculation of the corresponding cross section can be performed on the basis of the deformation information. Note that, when the cross section of the image of concern is an orthogonal cross section, it is preferable to obtain the corresponding cross section of each of the other images as an orthogonal cross section and, when the cross section of the image of concern is an arbitrary cross section, it is also preferable to obtain the corresponding cross section of each of the other images as an arbitrary cross section.

In Step S2080, the image processing apparatus 100 determines whether or not to specify the target position. For example, the result of the determination about a change is input on the basis of whether or not the user has operated a mouse not shown and located a mouse cursor on the cross-sectional image of the second three-dimensional image. When the input indicative of a change is received, the process is advanced to Step S2090. On the other hand, when an input indicative of a change is not received, the process is advanced to Step S2110.

In Step S2090, the target position specifying unit 112 specifies the target position on the cross-sectional image of the second three-dimensional image on the basis of the information input by a user's operation and transmits the specified target position to each of the corresponding position calculating unit 114 and the cross section setting unit 108. In Embodiment 1, the user operates the mouse not shown to locate the mouse cursor on the cross-sectional image and thus specify the target position. In FIG. 3, 312 denotes a figure representing the target position on the cross-sectional image 302 of the second three-dimensional image, while 313 denotes a figure representing the position on the cross-sectional image 303 of the first deformed image which is the same as the target position 312.

In Step S2100, the corresponding position calculating unit 114 calculates the corresponding position on the first three-dimensional image which corresponds to the target position specified in Step S2090 and transmits the calculated corresponding position to the cross section setting unit 108. Then, the process is returned to Step S2030. Specifically, using the information (deformation information) on the deformation field including the displacement vectors from the positions of the individual voxels of the second three-dimensional image to the corresponding positions on the first three-dimensional image, the corresponding position calculating unit 114 determines the corresponding position on the first three-dimensional image which corresponds to the target position on the cross-sectional image of the second three-dimensional image. In FIG. 3, 311 denotes a figure representing the corresponding position on the first three-dimensional image, while 314 denotes a figure representing the position on the second deformed image which is the same as the corresponding position 311.

In Step S2110, the image processing apparatus 100 determines whether or not to end the whole process. For example, the image processing apparatus 100 determines whether or not to end the whole process in accordance with a method such as detecting whether or not the operator has clicked an end button placed on the display 172 with the mouse not shown. When it is determined to end the process, the whole process by the image processing apparatus 100 is ended. On the other hand, when it is not determined to end the process, the process is returned to Step S2050.

As described above, in Embodiment 1, the first three-dimensional image obtained by imaging the object, the first deformed image obtained by deforming the first three-dimensional image in accordance with the second three-dimensional image, the second three-dimensional image, and the second deformed image obtained by deforming the second three-dimensional image in accordance with the first three-dimensional image are displayed in an arrangement. This allows the user to easily compare the images to each other.

[Modification]

In Embodiment 1, the case where the target position is specified on the cross-sectional image of the second three-dimensional image is described by way of example. However, the specification of the target position is not limited thereto. The target position may also be specified on the first deformed image. In this case, it is appropriate to process the target position specified on the cross-sectional image of the first deformed image as the target position on the second three-dimensional image.

Alternatively, the target position may also be specified on the cross-sectional image of the first three-dimensional image. In this case, in step S2100, using information (reverse deformation information) on a reverse deformation field including displacement vectors from the positions of the individual voxels of the first three-dimensional image to the corresponding positions on the second three-dimensional image, the corresponding position on the second three-dimensional image which corresponds to the target position on the cross-sectional image of the first three-dimensional image may be determined appropriately. Still alternatively, the target position may also be specified on the second deformed image. In this case, the target position specified on the cross-sectional image of the second deformed image may be processed appropriately as the target position on the first three-dimensional image.

In Embodiment 1, the case where the deformation information is the information on the deformation field including the displacement vectors from the positions of the individual voxels of the second three-dimensional image to the corresponding positions on the first three-dimensional image is described by way of example. However, the deformation information is not limited thereto and may also include both of the information on the deformation field including the displacement vectors from the positions of the individual voxels of the second three-dimensional image to the corresponding positions on the first three-dimensional image and the information on the deformation field including the displacement vectors from the positions of the individual voxels of the first three-dimensional image to the corresponding positions on the second three-dimensional image. In this case, in Step S2020, the information on the reverse deformation need not be calculated.

Also, in Embodiment 1, the case where the cross-sectional image 301 of the first three-dimensional image, the cross-sectional image 302 of the second three-dimensional image, the cross-sectional image 303 of the first deformed image, and the cross-sectional image 304 of the second deformed image are displayed in the form of arranged tiles is described by way of example. However, the display of the cross-sectional images is not limited thereto. A predetermined number of the cross-sectional images among the four cross-sectional images may also be switchably displayed. The number of the simultaneously displayed images, the positions where the individual images are disposed, and the predetermined number of images which are displayed at a time in the case of the switchable display are not limited, either. Also, a combination of the images in each display mode is arbitrary. The predetermined number of the images may also be changed by a user's operation. The same applies also to the case described later where the number of the images is other than 4.

For example, it may also be possible to switch between a mode which displays two images, i.e., the cross-sectional image 301 of the first three-dimensional image and the cross-sectional image 304 of the second deformed image and a display mode which displays two images, i.e., the cross-sectional image 302 of the second three-dimensional image and the cross-sectional image 303 of the first deformed image on the basis of the information input by a user's operation.

It may also be possible to switch between a display mode which displays two images, i.e., the cross-sectional image 301 of the first three-dimensional image and the cross-sectional image 303 of the first deformed image, and a display mode which displays two images, i.e., the cross-sectional image 302 of the second three-dimensional image and the cross-sectional image 304 of the second deformed image, on the basis of the information input by a user's operation. Alternatively, it may also be possible to switchably display the four cross-sectional images in succession on the basis of the information input by a user's operation.

Figure 7:
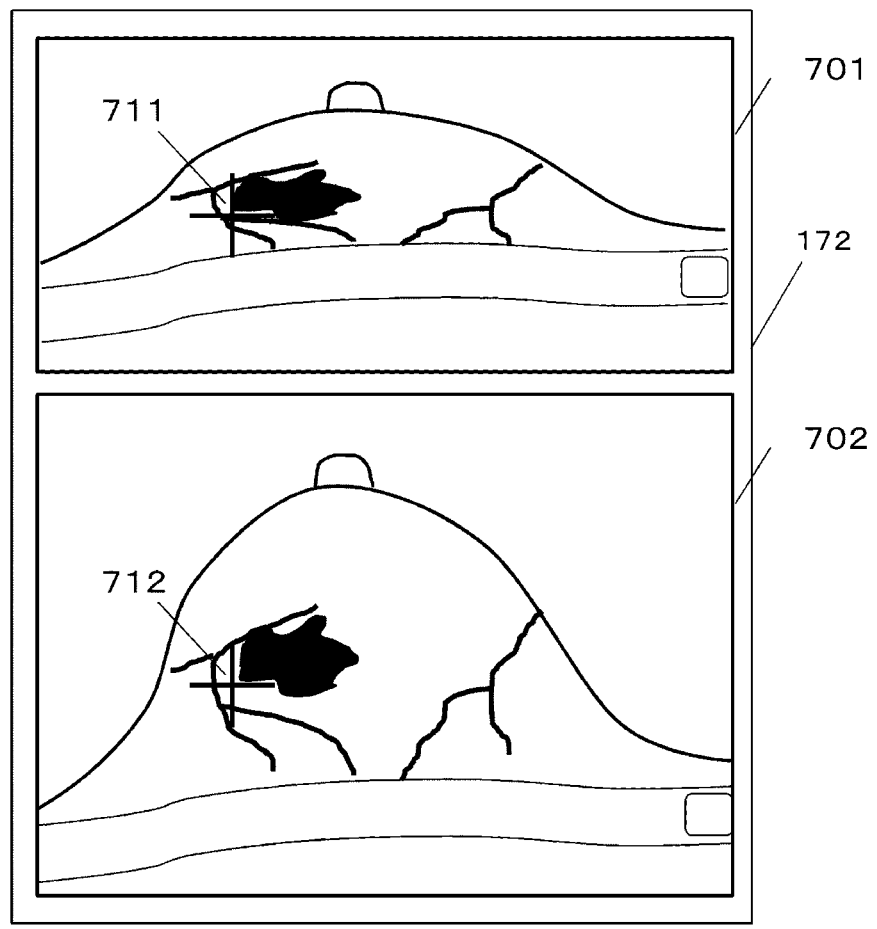
FIG. 7 is a view showing an example of a screen displayed by an image processing apparatus according to a modification of Embodiment 1.

The display of the images is not limited to the example described in Embodiment 1. As shown in FIG. 7, it may also be possible to display a superimposed image 701 obtained by superimposing the cross-sectional image of the second deformed image on the cross-sectional image of the first three-dimensional image and a superimposed image 702 obtained by superimposing the cross-sectional image of the first deformed image on the cross-sectional image of the second three-dimensional image in an arrangement. Alternatively, these images may also be switchably displayed.

Still alternatively, it may also be possible that, in a display region in the form of tiles in a 2×2 configuration, the respective cross-sectional images of the first and second three-dimensional images are arranged to be diagonally located and then the superimposed image obtained by superimposing the cross-sectional image of the first deformed image on the cross-sectional image of the second three-dimensional image and the superimposed image obtained by superimposing the cross-sectional image of the second deformed image on the cross-sectional image of the first three-dimensional image are disposed at the other remaining positions instead of the first and second deformed images. Yet alternatively, it may also be possible that, instead of the first and second deformed images, a cross-sectional image of a differential image between the second three-dimensional image and the first deformed image and a cross-sectional image of a differential image between the first three-dimensional image and the second deformed image are disposed to be displayed. Still alternatively, it may also be possible to allow the user to select which ones of the deformed images, the superimposed images, and the differential images are to be displayed at the positions of concern and switch the displayed images to the selected images.

Figure 8:
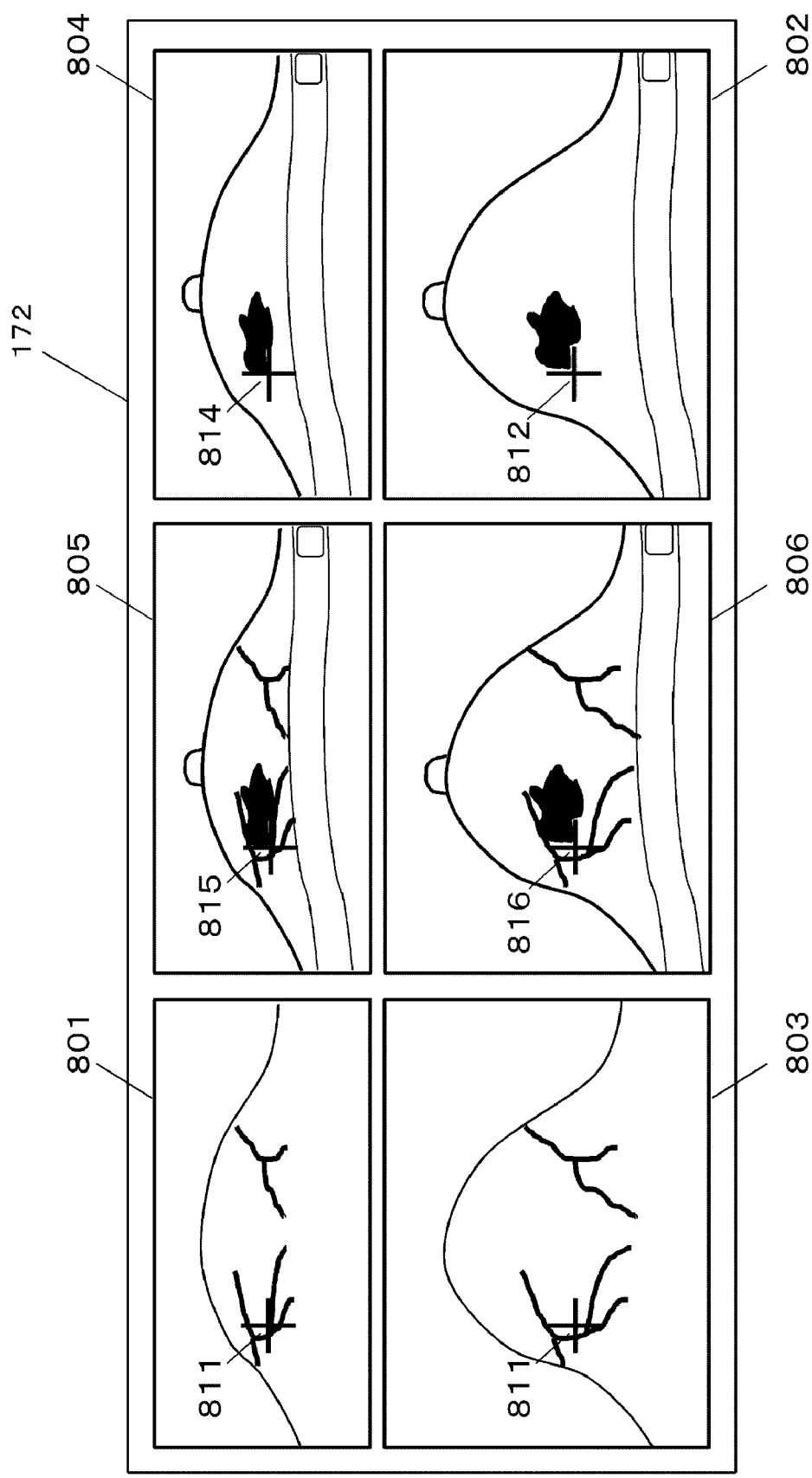
FIG. 8 is a view showing an example of the screen displayed by the image processing apparatus according to the modification of Embodiment 1.

The display of the images is not limited to the example described in Embodiment 1. As shown in FIG. 8, it may also be possible that a superimposed image 805 obtained by superimposing a cross-sectional image 804 of the second deformed image on a cross-sectional image 801 of the first three-dimensional image and a superimposed image 806 obtained by superimposing a cross-sectional image 803 of the first deformed image on a cross-sectional image 802 of the second three-dimensional image are arranged together with the four cross-sectional images described in Embodiment 1 to be displayed in the form of tiles in a 3×2 configuration. Alternatively, instead of the superimposed images, the differential images may also be displayed. It may also be possible to allow the user to select which ones of the images are to be displayed and allow the selected images to be switchably displayed. It may also be possible to allow the user to select among the various display modes described above via the operation unit. As an image (image based on the first deformed image) displayed in association with the deformation of the first image (first three-dimensional image), there is the first deformed image itself, the image obtained by superimposing the first deformed image on the second image, a differential image between the second image and the first deformed image, or the like. Also, as an image (image based on the second deformed image) displayed in association with the deformation of the second image (second three-dimensional image), there is the second deformed image itself, an image obtained by superimposing the second deformed image on the first image, a differential image between the first image and the second deformed image, or the like.

Embodiment 2

In Embodiment 2, a description will be given of an example in which three three-dimensional images obtained by imaging an object are each deformed in accordance with the other three-dimensional images to generate deformed images, and the deformed images are displayed in an arrangement. Note that, in Embodiment 2, it is assumed that deformation information representing deformation between the three-dimensional images has been obtained in advance. The following will describe an image processing apparatus according to Embodiment 2 with emphasis on the portions thereof different from those of the image processing apparatus in Embodiment 1. As for the same portions as in Embodiment 1, a detailed description thereof is omitted.

Figure 9:
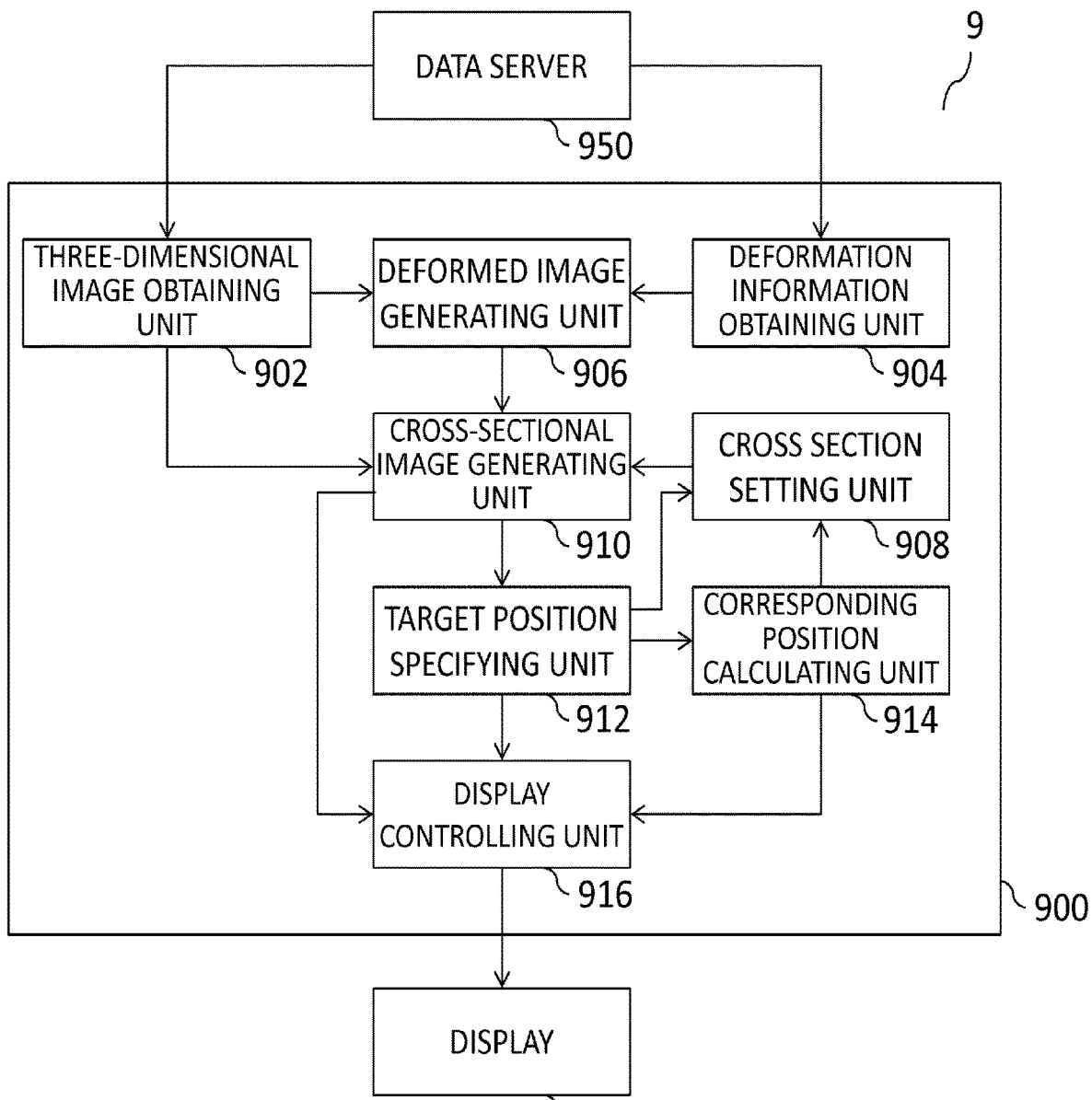
FIG. 9 is a view showing an example of a functional configuration of an image processing apparatus according to Embodiment 2.

FIG. 9 shows an example of a functional configuration of an image processing apparatus 900 according to Embodiment 2. An image processing system 9 in Embodiment 2 includes the image processing apparatus 900, a data server 950, and the display 172. Note that the same portions as in FIG. 1 are designated by the same reference numerals/symbols and a description thereof is omitted.

The data server 950 in Embodiment 2 holds a third three-dimensional image of the object in addition to the first and second three-dimensional images thereof. The data server 950 also holds deformation information representing deformation between the three-dimensional images. The deformation information in Embodiment 2 is information on a deformation field showing, for each of the three-dimensional images, respective positions on the other three-dimensional images which correspond to the positions of the individual voxels of each of the three-dimensional images.

A three-dimensional image obtaining unit 902 obtains each of the three-dimensional images of the object from the data server 150. A deformation information obtaining unit 904 obtains the deformation information representing deformation between the three-dimensional images from the data server 150. A deformed image generating unit 906 deforms, for each of the three-dimensional images, the other three-dimensional images such that the positions and shapes thereof match those of each of the three-dimensional images using the deformation information to generate six deformed images.

The six deformed images mentioned herein are:
a deformed image obtained by deforming the second three-dimensional image such that the position and shape thereof match those of the first three-dimensional image;
a deformed image obtained by deforming the third three-dimensional image such that the position and shape thereof match those of the second three-dimensional image;
a deformed image obtained by deforming the first three-dimensional image such that the position and shape thereof match those of the third three-dimensional image;
a deformed image obtained by deforming the first three-dimensional image such that the position and shape thereof match those of the second three-dimensional image;
a deformed image obtained by deforming the second three-dimensional image such that the position and shape thereof match those of the third three-dimensional image; and
a deformed image obtained by deforming the third three-dimensional image such that the position and shape thereof match those of the first three-dimensional image.

A cross section setting unit 908 sets respective cross sections into which the three-dimensional images and the deformed images thereof are to be cut. A cross-sectional image generating unit 910 generates cross-sectional images in the set cross sections from the individual three-dimensional images and the deformed images thereof. A target position specifying unit 912 specifies a target position on the cross-sectional image of any one of the three-dimensional images on the basis of the information input by a user's operation. A corresponding position calculating unit 914 calculates, for any one of the three-dimensional images, respective corresponding positions on the other three-dimensional images which correspond to the target position on the cross-sectional image of any one of the three-dimensional images. A display controlling unit 916 performs control for displaying the individual cross-sectional images and a screen for reporting other information to the user on the display 172.

Figure 10:
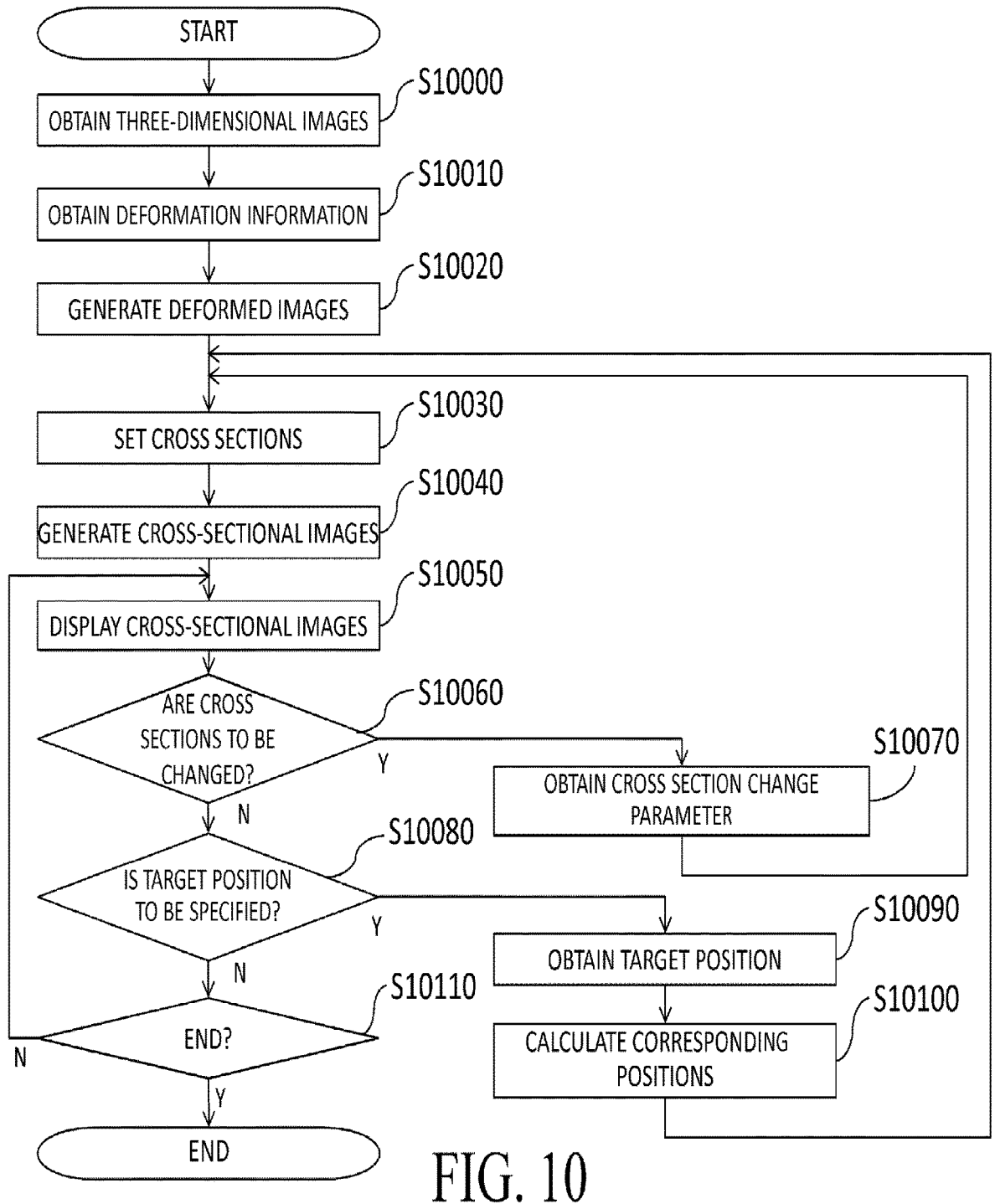
FIG. 10 is a flow chart showing an example of a process according to Embodiment 2.

FIG. 10 is a flow chart showing an example of the process performed by the image processing apparatus 900. The image processing apparatus 900 displays the three three-dimensional images of the object and the deformed images thereof in the form of arranged tiles. Since the process in Steps S10040, S10060, S10070, and S10110 is the same as that is Steps S2040, S2060, S2070, and S2110 in Embodiment 1, a description thereof is omitted herein.

In Step S10000, the three-dimensional image obtaining unit 902 obtains the three three-dimensional images of the object from the data server 950. Then, the three-dimensional image obtaining unit 902 transmits the obtained images to each of the deformed image generating unit 906 and the cross-sectional image generating unit 910.

In Step S10010, the deformation information obtaining unit 904 obtains, as the deformation information representing deformation between the three-dimensional images, the information on a deformation field showing, for each of the three-dimensional images, respective positions on the other three-dimensional images which correspond to the positions of the individual voxels of each of the three-dimensional images from the data server 950. Then, the deformation information obtaining unit 904 transmits the obtained deformation information to the deformed image generating unit 906.

In Step S10020, the deformed image generating unit 906 deforms, for each of the three-dimensional images, the other three-dimensional images using the deformation information obtained in Step S10010 such that the positions and shapes thereof match those of each of the three-dimensional images to generate the six deformed images described above. Then, the deformed image generating unit 906 transmits the generated six deformed images to each of the cross-sectional image generating unit 910 and the target position specifying unit 912.

In Step S10030, the cross section setting unit 908 sets respective cross sections into which the three-dimensional images obtained in Step S10000 are to be cut and respective cross sections into which the deformed images generated in Step S10020 are to be cut and transmits information on each of the set cross sections to the cross-sectional image generating unit 910. Since a method of setting the cross sections is the same as in Embodiment 1, a description thereof is omitted.

In Step S10050, the display controlling unit 916 performs control for displaying each of the cross-sectional images generated in Step S10040 on the display 172. In the present embodiment, the individual cross-sectional images are arranged in the form of tiles in a 3×3 configuration. At this time, the i-th three-dimensional image is disposed at a position (i, i) on a diagonal line across the arranged tiles. In addition, a deformed image obtained by deforming the i-th three-dimensional image in accordance with the j-th three-dimensional image is disposed at a position (i, j) over the arranged tiles.

Figure 11:
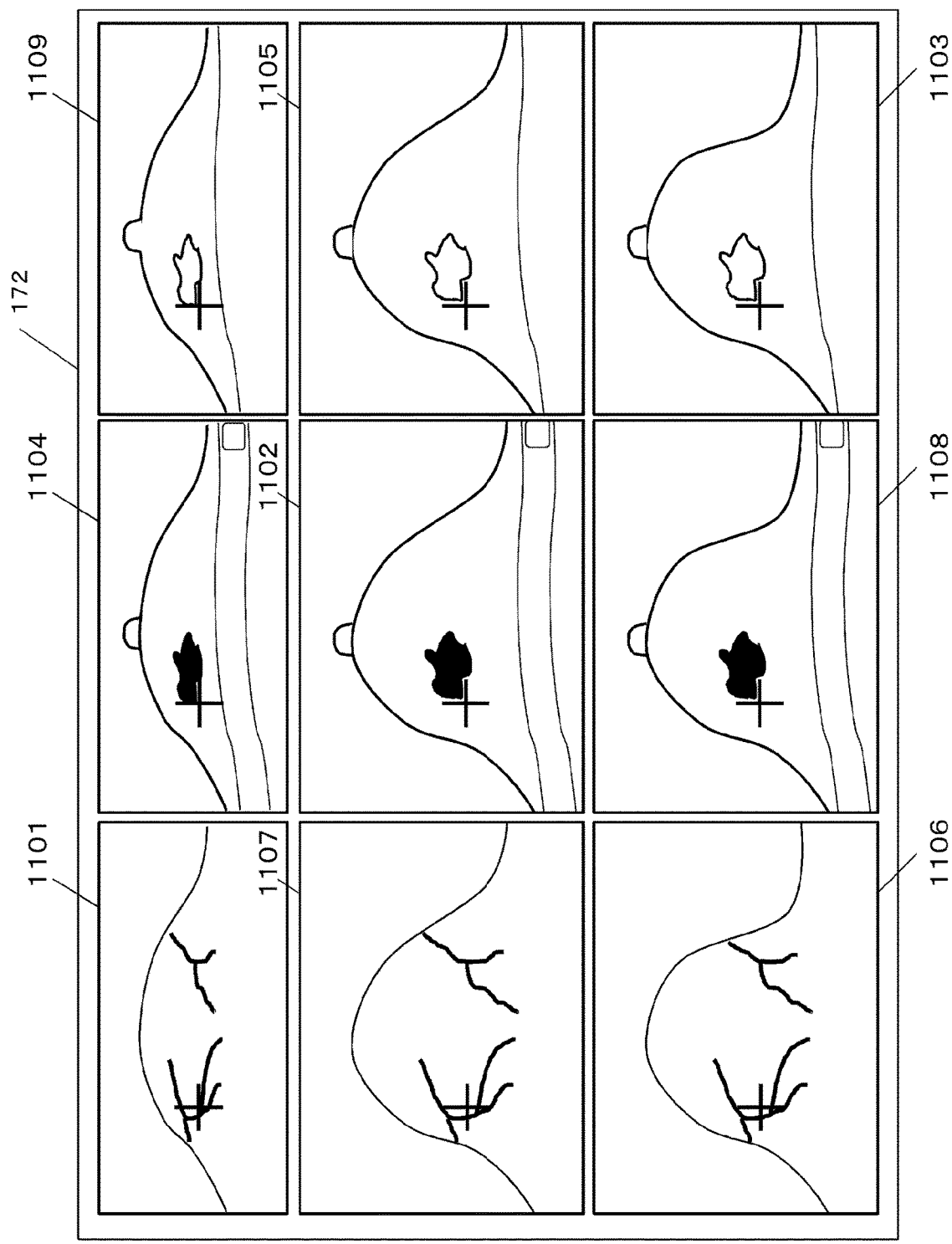
FIG. 11 is a view showing an example of a screen displayed by the image processing apparatus according to Embodiment 2.

FIG. 11 shows an example of cross-sectional images 1101, 1102, and 1103 of the three three-dimensional images of the object and cross-sectional images 1104, 1105, 1106, 1107, 1108, and 1109 of the six deformed images which are displayed on the display 172. As shown in FIG. 11, in Embodiment 2, the individual cross-sectional images are arranged in the form of tiles such that the cross-sectional images 1101, 1102, and 1103 of the three three-dimensional images are diagonally located. On the other hand, the six cross-sectional images 1104, 1105, 1106, 1107, 1108, and 1109 are disposed at respective appropriate positions which are not located on diagonal lines.

In Step S10080, the image processing apparatus 900 determines whether or not to specify the target position. For example, the presence or absence of a change can be determined by detecting whether or not the user has operated a mouse not shown and located a mouse cursor on the cross-sectional image of any one of the three-dimensional images. When an input indicative of a change is received, the process is advanced to Step S10090. On the other hand, when an input indicative of a change is not received, the process is advanced to Step S10110.

In Step S10090, the target position specifying unit 912 specifies the target position on the cross-sectional image of any one of the three-dimensional images on the basis of the information input by a user's operation and transmits the specified target position to each of the corresponding position calculating unit 914 and the cross section setting unit 908.

In Step S10100, the corresponding position calculating unit 914 calculates, for any one of the three-dimensional images, the respective corresponding positions on the other three-dimensional images which correspond to the target position on the cross-sectional image of any one of the three-dimensional images and transmits the calculated corresponding positions to the cross section setting unit 908. Then, the process is returned to Step S10030. Since a specific calculation method is the same as in Embodiment 1, a description thereof is omitted.

As described above, in Embodiment 2, the deformed images are generated by deforming each of the three three-dimensional images obtained by imaging the object in accordance with the other three-dimensional images and displayed in an arrangement. This allows the user to easily compare the three images to each other.

[Modification]

In Embodiment 2, the case where the cross-sectional images 1101, 1102, and 1103 of the three three-dimensional images of the object and the cross-sectional images 1104, 1105, 1106, 1107, 1108, and 1109 of the six deformed images are displayed in the form of arranged tiles is described by way of example. However, the display of the cross-sectional images is not limited thereto. These nine cross-sectional images may also be switchably displayed. The number of the images displayed at a time in the switchable display may be 1, 3, or another number.

Also, in Embodiment 2, the case where the number of the three-dimensional images obtained by imaging the object is 3 is described by way of example. However, the number of the three-dimensional images is not limited thereto and may also be 4 or more.

Also, in Embodiment 2, the case where the target position is specified on the cross-sectional image of any one of the three-dimensional images is described by way of example. However, the specification of the target position is not limited thereto. The target position may also be specified on the cross-sectional image of any one of the deformed images.

Embodiment 3

A characteristic feature of Embodiment 3 relates to the orientations of the cross-sectional images of the first and second three-dimensional images. Specifically, the display of the cross-sectional images is switched between a mode which exclusively displays the images in orthogonal cross sections and a mode which allows the images to be displayed in arbitrary cross sections. The following will describe an image processing apparatus according to Embodiment 3 with emphasis on the portions thereof different from those of the image processing apparatus in Embodiment 1. As for the same portions as in Embodiment 1, a detailed description thereof is omitted.

Figure 12:
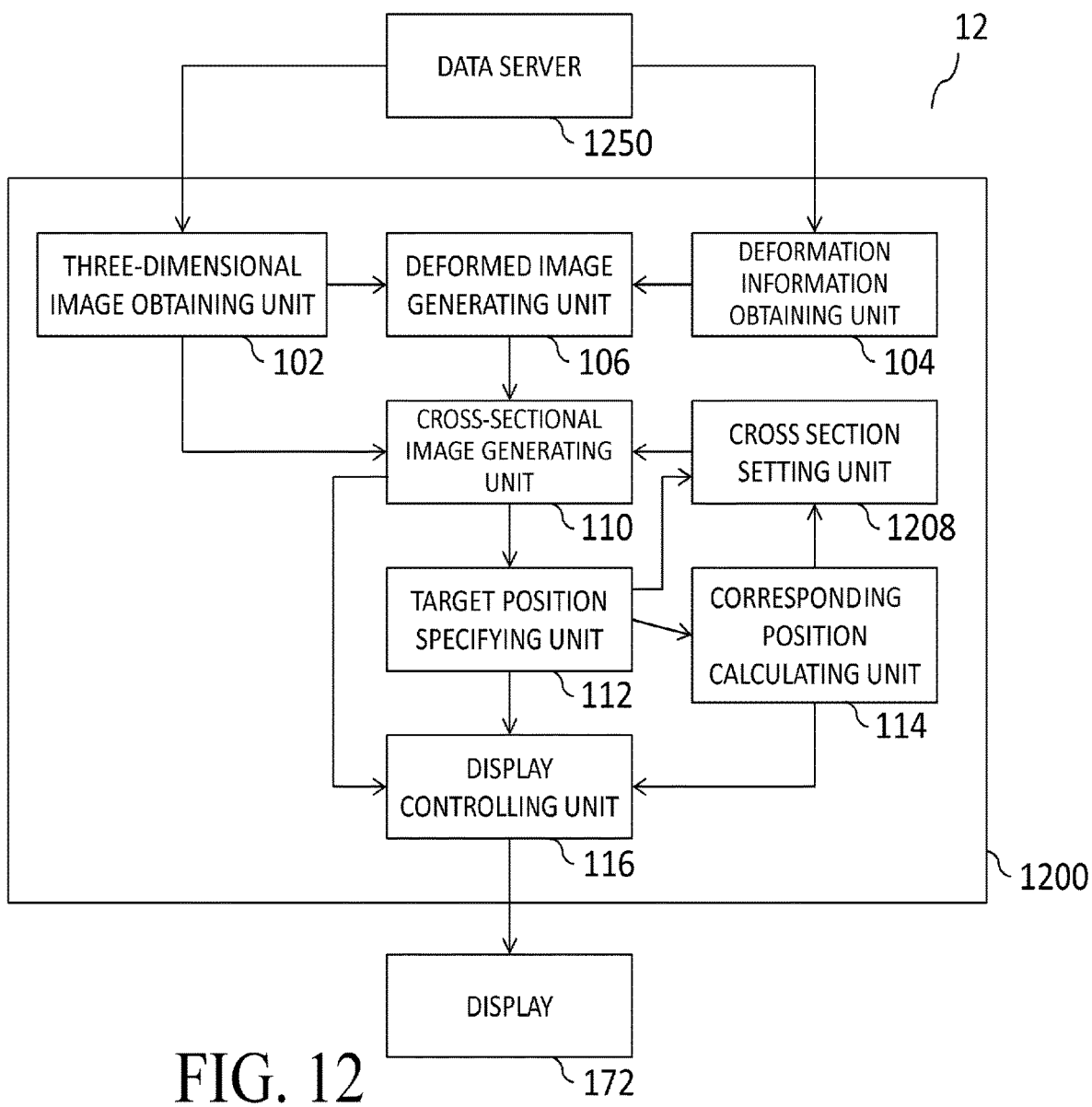
FIG. 12 is a view showing an example of a functional configuration of an image processing apparatus according to Embodiment 3.

FIG. 12 shows an example of a functional configuration of an image processing apparatus 1200 according to Embodiment 3. An image processing system 12 in Embodiment 3 includes the image processing apparatus 1200, a data server 1250, and the display 172. Note that the same portions as in FIG. 1 are designated by the same reference numerals/symbols and a description thereof is omitted.

A cross section setting unit 1208 in Embodiment 3 sets respective cross sections into which the first and second three-dimensional images and the first and second deformed images are to be cut. In Embodiment 3, as a cross section change parameter, information showing whether the orientations of the cross sections are to be limited to those of orthogonal cross sections or the orientation of an arbitrary cross section is also allowed.

Figure 13:
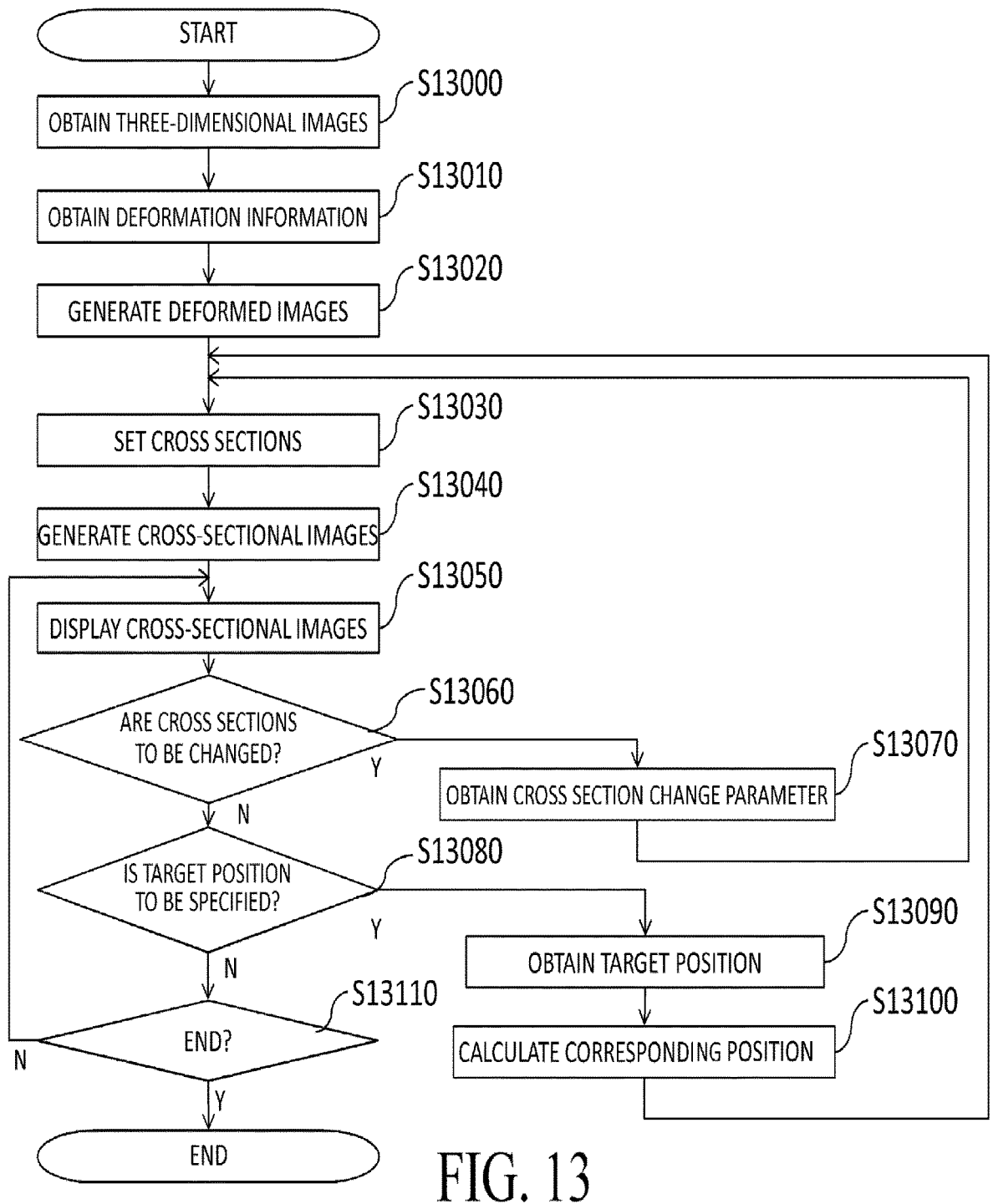
FIG. 13 is a flow chart showing an example of a process according to Embodiment 3.

FIG. 13 is a flow chart showing an example of the process performed by the image processing apparatus 1200. The image processing apparatus 1200 displays, for each of the cross-sectional images, an orthogonal cross-sectional image in an orthogonal cross section or an arbitrary cross-sectional image in an arbitrary cross section. Since the process in Steps S13000 to S13020, S13040 to S13060, and Steps S13080 to S13110 is the same as the process in Steps S2000 to S2020, S2040 to S2060, and S2080 to S2110 in Embodiment 1, a description thereof is omitted herein.

In Step S13030, the cross section setting unit 1208 sets respective cross sections into which the three-dimensional images obtained in Step S10000 are to be cut and respective cross sections into which the deformed images generated in Step S10020 are to be cut. Then, the cross section setting unit 1208 transmits information on each of the set cross sections to the cross-sectional image generating unit 110.

The process in the initial state in this process step and the process when there is a transition from Step S13070 to this process step are the same as in Embodiment 1 so that a description thereof is omitted. On the other hand, when there is a transition from Step S13100 to this process step, the cross sections into which the second three-dimensional image and the first deformed image are to be cut that include the target position specified in Step 13090 and the cross sections into which the first three-dimensional image and the second deformed image are to be cut that include the corresponding position calculated in Step S13100 are set on the basis of information showing whether the orientations of the cross sections are limited to those of orthogonal cross section or the orientation of an arbitrary cross section is also allowed, which is set in Step S13070.

When an arbitrary cross section is also allowed as the cross section into which the first three-dimensional image for which the corresponding position is calculated is to be cut, an arbitrary cross section for the first three-dimensional image which corresponds to the cross-sectional image of the second three-dimensional image is calculated as a third cross-sectional image in accordance with the method described in, e.g., Japanese Patent Application Laid-open No. 2011-125570. Then, the calculated arbitrary cross-sectional image is set as the cross section into which the first three-dimensional image is to be cut.

On the other hand, when the cross section into which the first three-dimensional image is to be cut is limited to an orthogonal cross section, the one of the three orthogonal cross sections, i.e., an axial cross section, a sagittal cross section, and a coronal cross section which is closest to the arbitrary cross section described above is selected to be set. Alternatively, any one of the orthogonal cross sections is specified in advance to be set. Information on the cross section specified in advance may be included in the information obtained by the image processing apparatus 1200 or included in input information received by the operation unit from the user.

When the cross section into which the cross-sectional image of the first three-dimensional image is to be cut is limited to an orthogonal cross section and an arbitrary cross section is also allowed as the cross section into which the cross-sectional image of the second three-dimensional image is to be cut, an arbitrary cross section for the second three-dimensional image corresponding to the orthogonal cross section for the first three-dimensional image is calculated again to be set again as the cross section into which the second three-dimensional image is to be cut.

In Step S13070, the cross section setting unit 1208 sets a cross section change parameter in response to an operation performed by the user using the operation unit 1709 and transmits the set cross section change parameter to the cross-sectional image generating unit 110. Then, the process is returned to Step S13030. In Embodiment 3, in addition to the cross section change parameter described in Step S2070, information showing whether the orientations of the cross sections are limited to those of orthogonal cross sections or the orientation of an arbitrary cross section is also allowed for each of the cross-sectional images of the first and second three-dimensional images is also set as a cross section change parameter.

For example, when the "t" key is pressed, the cross section for the cross-sectional image of the first three-dimensional image is limited to an orthogonal cross section and, when the "T" key is pressed, the cross section for the cross-sectional image of the second three-dimensional image is limited to an orthogonal cross section. On the other hand, when the "u" key is pressed, an arbitrary cross section is also allowed as the cross section for the cross-sectional image of the first three-dimensional image and, when the "U" key is pressed, an arbitrary cross section is also allowed as the cross section for the cross-sectional image of the second three-dimensional image. When the cross section for the cross-sectional image of one of the three-dimensional images is limited to an orthogonal cross section, the cross section for the cross-sectional image of the other three-dimensional image may also be automatically limited to an orthogonal cross section. Likewise, when an arbitrary cross section is allowed as the cross section for the cross-sectional image of one of the three-dimensional images, as the cross section for the cross-sectional image of the other three-dimensional image, an arbitrary cross section may also be automatically allowed. Note that information showing whether an arbitrary cross section is a curved cross section corresponding to the other cross section, a cross section obtained by approximating the curved cross section with a plane, or a cross section obtained by projecting the curved cross section onto a plane may also be set as a cross section change parameter.

As described above, in Embodiment 3, in terms of the orientation of each of the cross-sectional images of the first and second three-dimensional images, the display of the images is switched between the mode which exclusively displays the images in orthogonal cross sections or the mode which allows the images to be displayed also in arbitrary cross sections. This allows the user to easily compare the images to each other in the orientations of cross sections in which the images are easily comparable.

[Modification]

In Embodiment 3, the description has been given of the example in which the display of images is switched between the mode which limits the cross sections used to display the images to orthogonal cross sections and the mode which also allows arbitrary cross sections to be used to display the images. However, the display of the images is not limited thereto. Both of orthogonal cross sections and arbitrary cross sections may also be used simultaneously to display images.

Embodiment 4

In Embodiment 4, a description will be given of an example in which the corresponding position on the first three-dimensional image which corresponds to the target position specified on the cross-sectional image of the second third-dimensional image is corrected on the basis of the information input by a user's operation to update the deformation information. The following will describe an image processing apparatus according to Embodiment 4 with emphasis on the portions thereof different from those of the image processing apparatus in Embodiment 1. As for the same portions as in Embodiment 1, a detailed description thereof is omitted.

Figure 14:
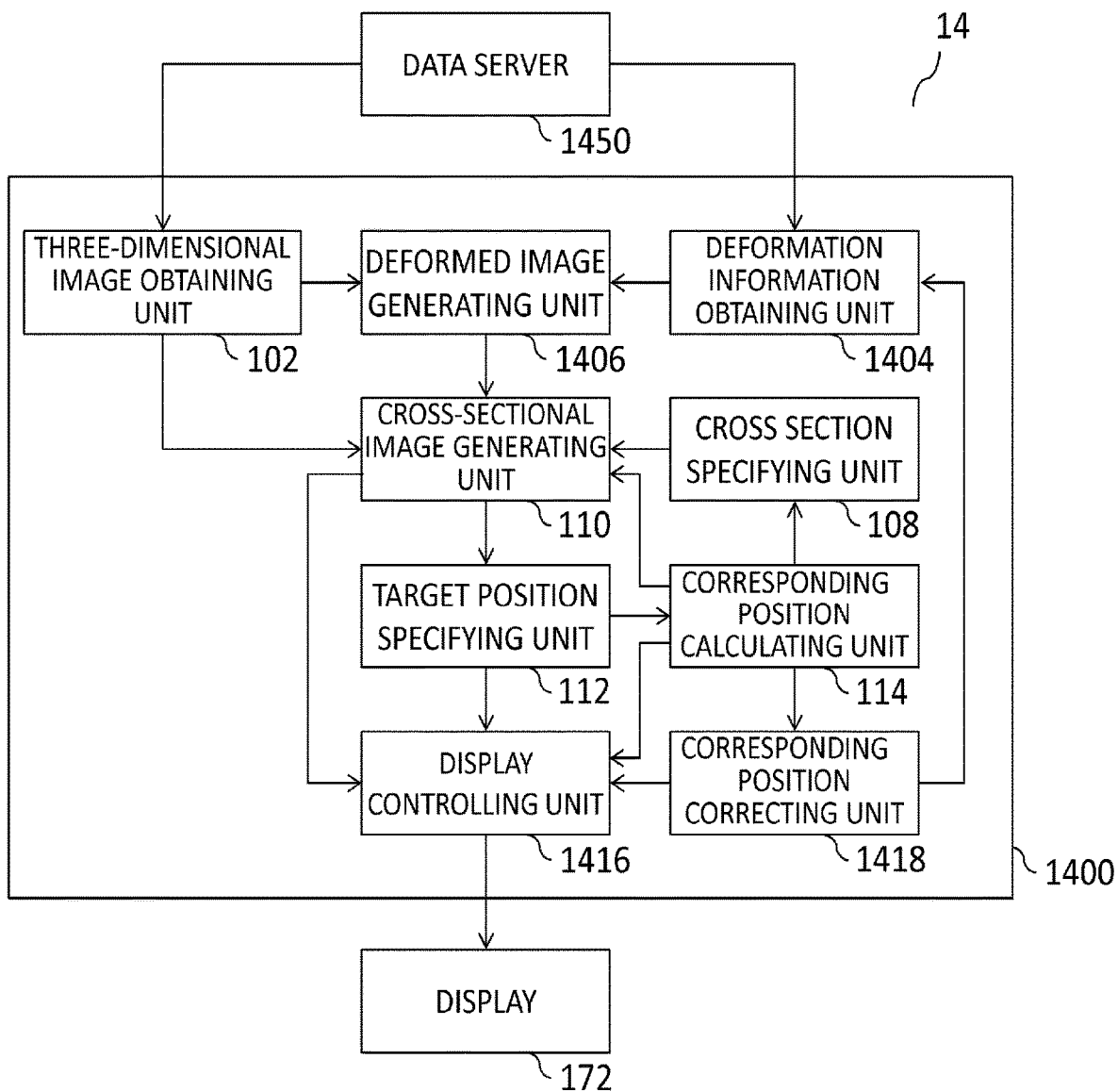
FIG. 14 is a view showing an example of a functional configuration of an image processing apparatus according to Embodiment 4.

FIG. 14 shows an example of a functional configuration of an image processing apparatus 1400 according to Embodiment 4. An image processing system 14 in Embodiment 4 includes the image processing apparatus 1400, a data server 1450, and the display 172. Note that the same portions as in FIG. 1 are designated by the same reference numerals/symbols and a description thereof is omitted.

The data server 1450 holds, as the deformation information representing deformation between the first and second three-dimensional images, information on a plurality of sets of corresponding points in the first and second three-dimensional images. A deformation information obtaining unit 1404 obtains the information on the plurality of sets of corresponding points in the first and second three-dimensional images from the data server 1450. The deformation information obtaining unit 1404 also adds a set of corresponding points including the target position specified on the cross-sectional image of the second three-dimensional image and the corresponding position on the first three-dimensional image which is corrected on the basis of the information input by a user's operation to the information on the plurality of sets of corresponding points. The deformation information obtaining unit 1404 also derives the deformation information representing deformation between the first and second three-dimensional images using the information on the plurality of sets of corresponding points. A deformed image generating unit 1406 deforms the first three-dimensional image using the obtained deformation information such that the position and shape thereof match those of the second three-dimensional image to generate the first deformed image. The deformed image generating unit 1406 also deforms the second three-dimensional image such that the position and shape thereof match those of the first three-dimensional image to generate the second deformed image.

A display controlling unit 1416 performs control for displaying the respective cross-sectional images of the first and second three-dimensional images and the first and second deformed images and a screen for reporting other information to the user on the display 172. The display controlling unit 1416 also performs control for displaying figures representing the positions of the plurality of sets of corresponding points obtained from the data server 1450 and figures representing the positions of the newly added set of corresponding points in different display forms on all the cross-sectional images. A corresponding position correcting unit 1418 corrects the corresponding position on the first three-dimensional image which corresponds to the target position specified on the cross-sectional image of the second three-dimensional image on the basis of the information input by a user's operation.

Figure 15:
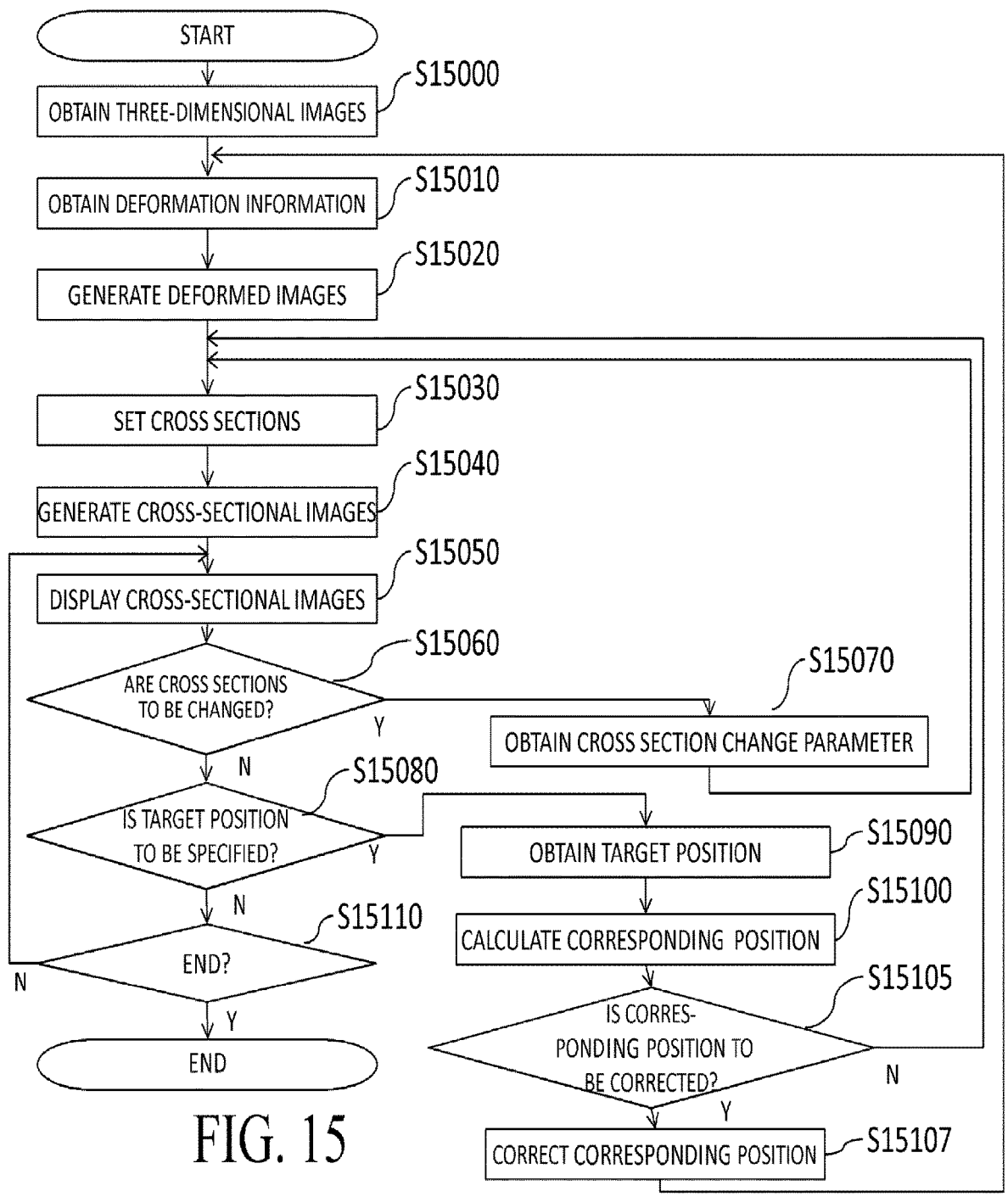
FIG. 15 is a flow chart showing an example of a process according to Embodiment 4.

FIG. 15 is a flow chart showing an example of the process performed by the image processing apparatus 1400. The image processing apparatus 1400 updates the deformation information on the basis of the correction of the corresponding position. The process in Steps S15000, S15110, S15030 to S15040, and S15060 to S15100 is the same as the process in Steps S2000, S2110, S2030 to S2040, and S2060 to S2100 in Embodiment 1 so that a description thereof is omitted herein.

In Step S15010, the deformation information obtaining unit 1404 obtains the information on the plurality of sets of corresponding points in the first and second three-dimensional images from the data server 1450. When there is a transition from Step S15107 described later to this process step, the set of corresponding points including the target position specified on the cross-sectional image of the second three-dimensional image and the corresponding position on the first three-dimensional image which is corrected on the basis of the information input by a user's operation is added to the information on the plurality of sets of corresponding points. Then, the deformation information obtaining unit 1404 derives the deformation information representing deformation between the first and second three-dimensional images using the obtained information on the plurality of sets of corresponding points. For the process of deriving the deformation information from the sets of corresponding points, any known method can be used. Then, the deformation information obtaining unit 1404 transmits the derived deformation information to the deformed image generating unit 1406.

In Step S15020, using the deformation information obtained in Step S15010, the deformed image generating unit 1406 deforms the first three-dimensional image such that the position and shape thereof match those of the second three-dimensional image to generate the first deformed image. For the deformation process, any known method can be used. Then, the deformed image generating unit 1406 calculates information on a deformation field including displacement vectors from the positions of the individual voxels of the second three-dimensional image to the corresponding positions on the first three-dimensional image. The deformed image generating unit 1406 also calculates reverse deformation information for deforming the second three-dimensional image such that the position and shape thereof match those of the first three-dimensional image and then deforms the second three-dimensional image such that the position and shape thereof match those of the first three-dimensional image to generate the second deformed image.

Figure 16:
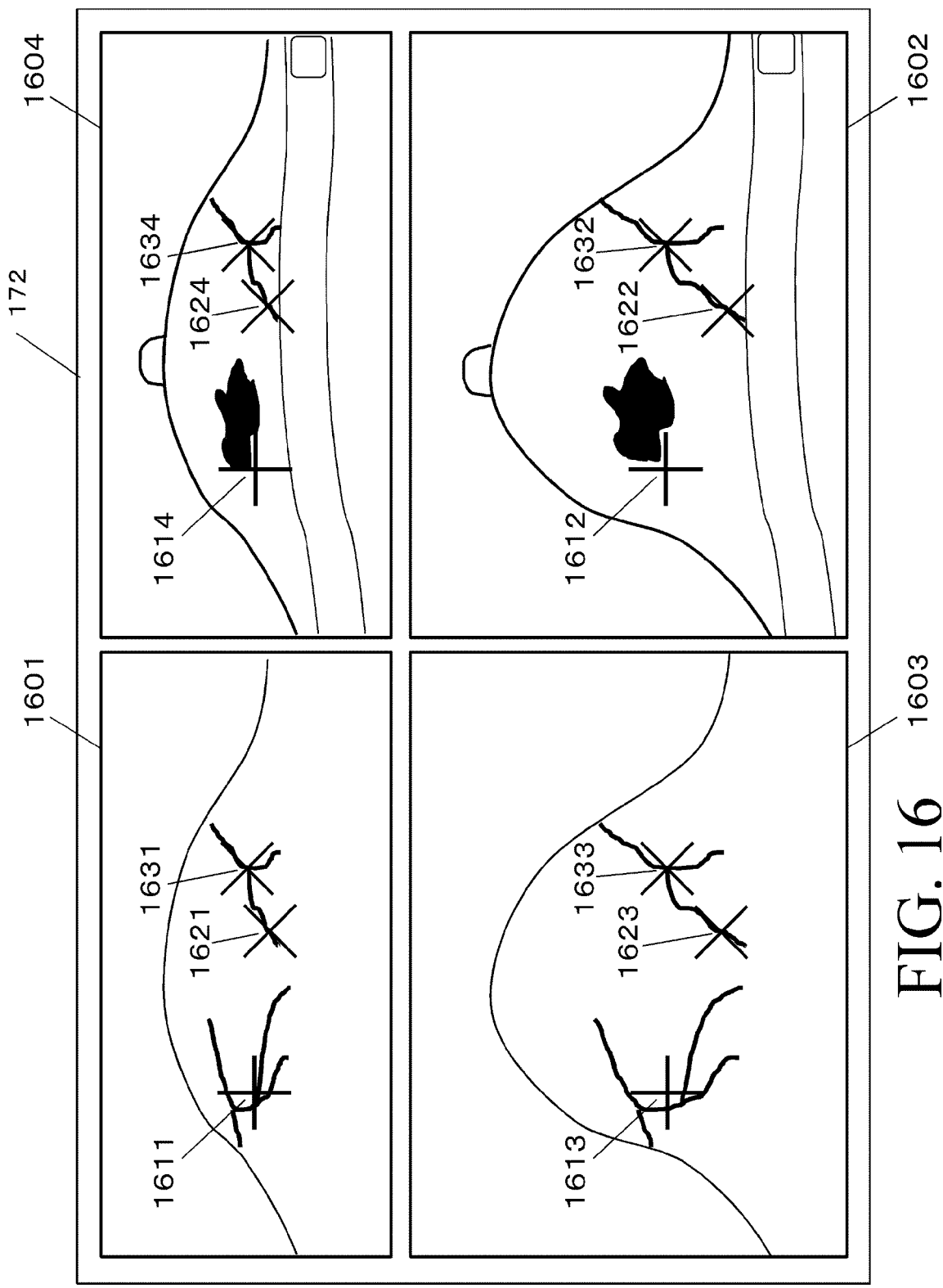
FIG. 16 is a view showing an example of a screen displayed by the image processing apparatus according to Embodiment 4.

In Step S15050, the display controlling unit 1416 performs control for displaying each of the cross-sectional images generated in Step S14040 on the display 172. FIG. 16 shows an example of a cross-sectional image 1601 of the first three-dimensional image of the object, a cross-sectional image 1602 of the second three-dimensional image, a cross-sectional image 1603 of the first deformed image, and a cross-sectional image 1604 of the second deformed image which are displayed on the display 172. In Embodiment 4, figures (1611, 1612, 1613, and 1614) representing the positions of the newly added sets of corresponding points and figures (1621, 1622, 1623, 1624, 1631, 1632, 1633, and 1634) representing the positions of the plurality of sets of corresponding points obtained from the data server 1450 are also displayed in different display forms on all the cross-sectional images.

In Step S15015, the image processing apparatus 1400 determines whether or not to correct the sets of corresponding points. For example, by detecting whether or not the user has operated a mouse not shown and clicked on the cross-sectional image of the first three-dimensional image, the image processing apparatus 1400 determines the presence or absence of a change. When an input indicative of a change is received, the process is advanced to Step S15107. On the other hand, when an input indicative of a change is not received, the process is returned to Step S15030.

In Step S15107, the corresponding position correcting unit 1418 corrects the corresponding position on the first three-dimensional image which corresponds to the target position specified on the cross-sectional image of the second three-dimensional image to the position on the cross-sectional image of the first three-dimensional image where the user has clicked by operating the mouse not shown. Then, the corresponding position correcting unit 1418 transmits the corrected corresponding position to each of the deformation information obtaining unit 1404 and the display controlling unit 1416.

As described above, in Embodiment 4, by correcting the corresponding position on the first three-dimensional image which corresponds to the target position specified on the cross-sectional image of the second three-dimensional image on the basis of the information input by a user's operation, the deformation information is updated. This allows the user to easily recognize the appropriateness of registration between the images and correct the registration as necessary.

Embodiment 5

In Embodiment 5, a description will be given of an example which allows, in an image processing apparatus for displaying the first and second three-dimensional images in an arrangement, the correspondence relationship therebetween to be more easily recognized. Specifically, when one of the points in sets of corresponding known points in the individual images is specified as a target point, a cross-sectional image including the position (target position) of the target point is generated from the second three-dimensional image, while a cross-sectional image including the position (corresponding position) of the corresponding point which corresponds to the target point is generated from the first three-dimensional image. The following will describe Embodiment 5 with emphasis on the portions thereof different from those of Embodiment 1. As for the same portions as in Embodiment 1, a detailed description thereof is omitted.

Figure 18:
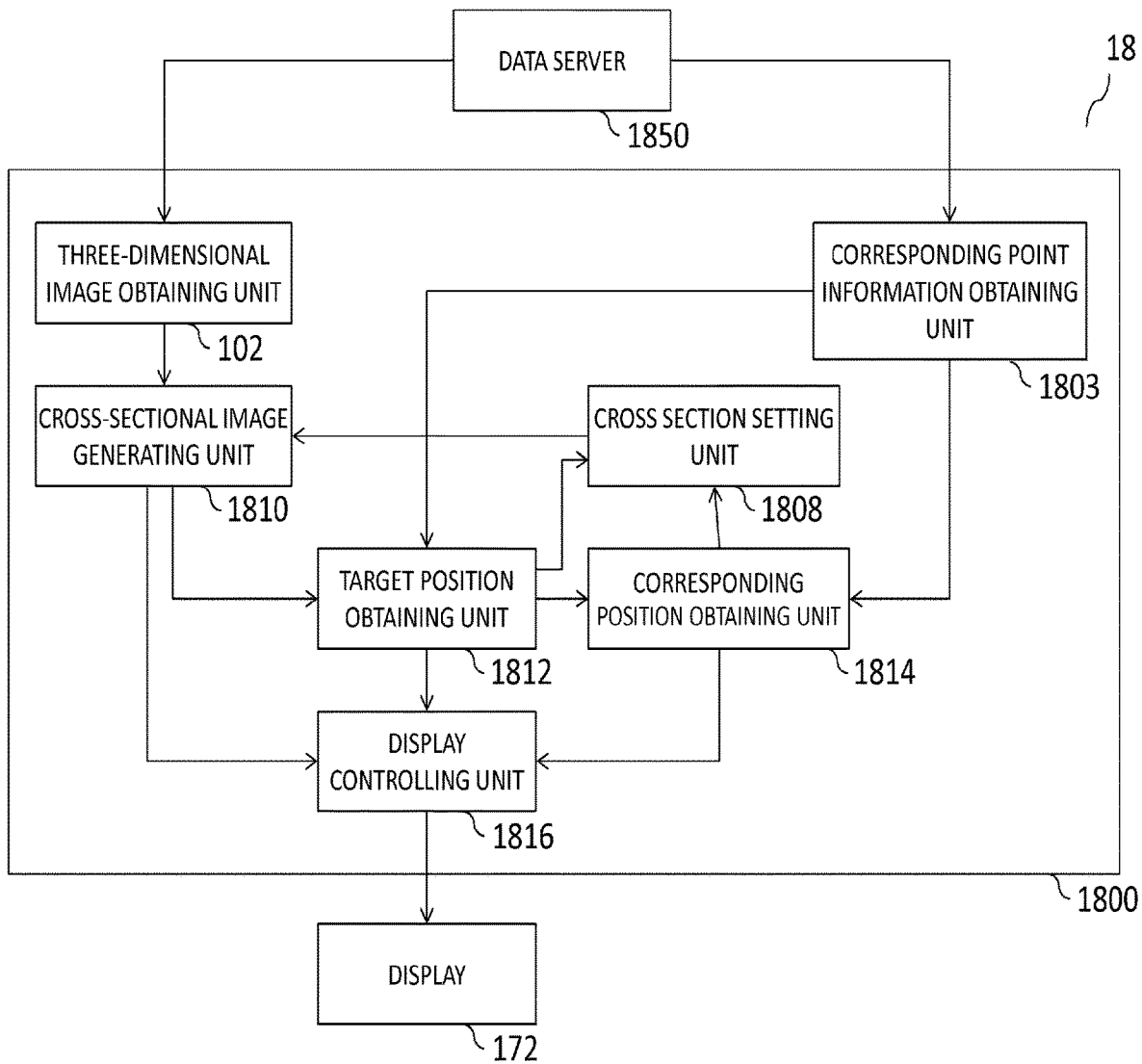
FIG. 18 is a view showing an example of a functional configuration of an image processing apparatus according to Embodiment 5.

FIG. 18 is a view showing an example of a functional configuration of an image processing apparatus 1800 according to Embodiment 5. An image processing system 18 in Embodiment 5 includes the image processing apparatus 1800, a data server 1850, and the display 172. Note that the same portions as in FIG. 1 are designated by the same reference numerals/symbols and a description thereof is omitted.

The data server 1850 holds the first and second three-dimensional images of the object. The data server 1850 also holds the three-dimensional coordinate values of the sets of corresponding known points in the first and second three-dimensional images.

A corresponding point information obtaining unit 1803 obtains the three-dimensional coordinate values of the sets of corresponding known points in the first and second three-dimensional images from the data server 1850.

A cross section setting unit 1808 sets a cross section into which the second three-dimensional image is to be cut on the basis of the target position described later. The cross section setting unit 1808 also sets a cross section into which the first three-dimensional image is to be cut on the basis of the corresponding position described later.

A cross-sectional image generating unit 1810 generates cross-sectional images in the set cross sections from the first and second three-dimensional images.

A target position obtaining unit 1812 specifies a position on the cross-sectional image of the second three-dimensional image on the basis of the information input by a user's operation. The user can perform such an input operation using the operation unit 1709 shown in FIG. 17. The target position obtaining unit 1812 selects one of the points in the sets of known points as the target point on the basis of the specified position and the positions of the set of known points on the second three-dimensional image and obtains the position of the selected target point as the target position.

A corresponding position obtaining unit 1814 obtains the position (corresponding position) of the corresponding point on the first three-dimensional image which corresponds to the target point on the second three-dimensional image from the information on the sets of known points.

A display controlling unit 1816 performs control for displaying the respective cross-sectional images of the first and second three-dimensional images and a screen for reporting other information to the user on the display 172. The cross-sectional image of the first three-dimensional image can be referred to as a first cross-sectional image. The cross-sectional image of the second three-dimensional image can be referred to as a second cross-sectional image. At this time, the display controlling unit 1816 performs control such that the position (target position) of the target point on the second three-dimensional image coincides with the position (corresponding position) of the corresponding point on the first three-dimensional image in a lateral or vertical direction on the displayed screen. For this purpose, the display controlling unit 1816 adjusts the display position of the cross-sectional image of the first three-dimensional image using such a method as locating the display position of the corresponding point at the display position of the target point. At this time, the display controlling unit 1816 adjusts the position of the second cross-sectional image such that the corresponding position after the adjustment coincides with the target position before the adjustment in a vertical or lateral direction on the screen of the displaying unit and displays the cross-sectional images.

Figure 19:
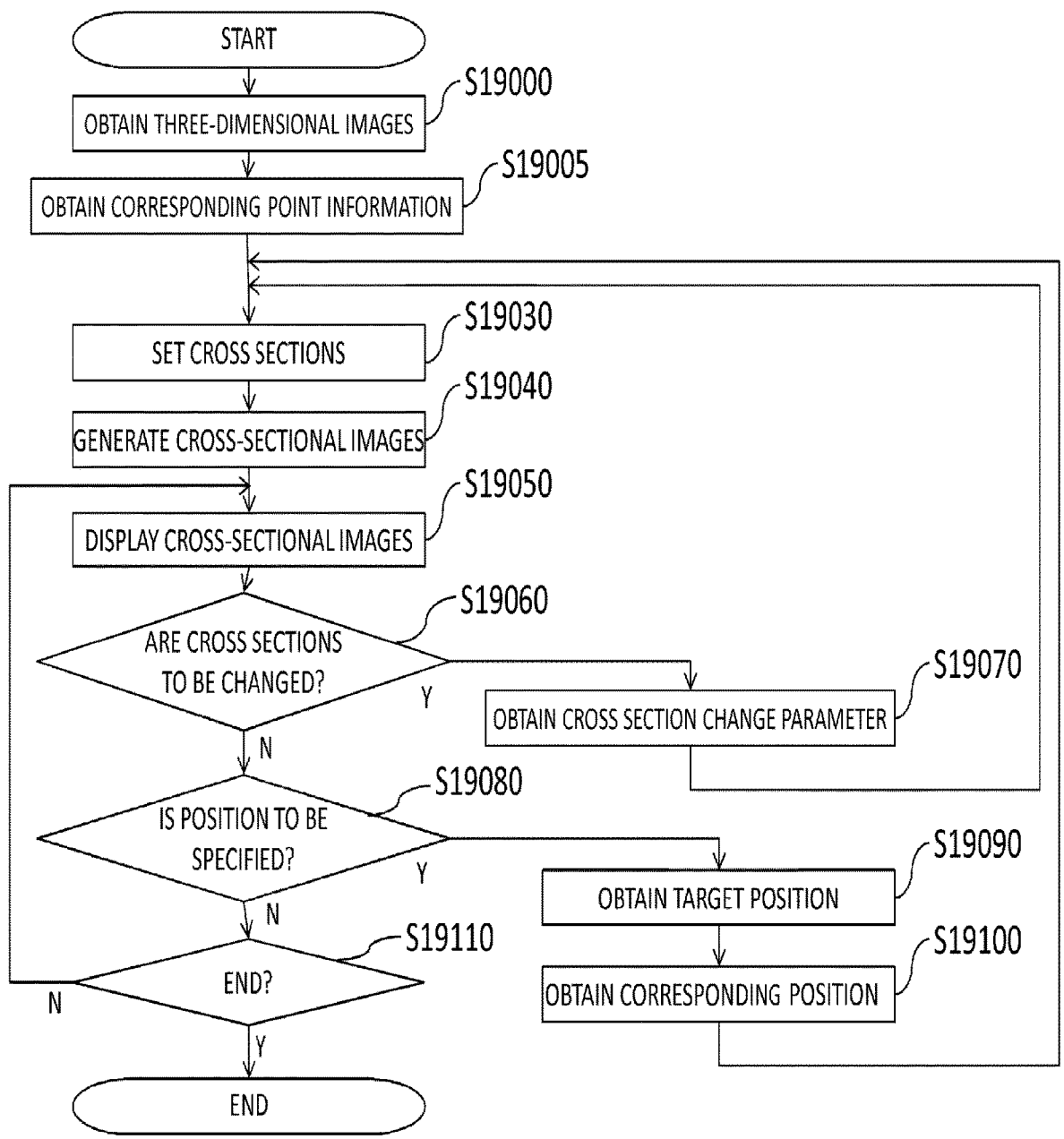
FIG. 19 is a flow chart showing an example of a process according to Embodiment 5.

FIG. 19 is a flow chart showing an example of the process performed by the image processing apparatus 1800. The image processing apparatus 1800 displays the cross-sectional image including the target point and the cross-sectional image including the corresponding point such that the position (target position) of the target point coincides with the position (corresponding position) of the corresponding point on the displayed screen. The process in Steps S19000, S19060, S19070, and S19110 is the same as the process in Steps S2000, S2060, S2070, and S2110 in Embodiment 1 so that a description thereof is omitted herein.

In Step S19005, the corresponding point information obtaining unit 1803 obtains the three-dimensional coordinate values of the sets of corresponding known points in the first and second three-dimensional images from the data server 1850. Then, the corresponding point information obtaining unit 1803 transmits the obtained corresponding point information to each of the target position obtaining unit 1812 and the corresponding position obtaining unit 1814.

In Step S19030, the cross section setting unit 1808 sets respective cross sections into which the individual three-dimensional images obtained in Step S19000 are to be cut. When there is a transition from Step S19100 described later to this process step, a cross section into which the second three-dimensional image is to be cut that passes through the target position obtained in Step S19090 is set. That is, when the cross section into which the second three-dimensional image is to be cut does not pass through the target position, the cross section is translated in a direction perpendicular to the cross section so as to pass through the target position. In addition, the cross section into which the first three-dimensional image is to be cut that passes through the corresponding position obtained in Step S19100 is set. The process when there is a transition from Step S19020 or Step S19070 to this process step is the same as the process when there is a transition from Step S2020 or S2070 to Step S2030 so that a description thereof is omitted.

In Step S19040, the cross-sectional image generating unit 1810 cuts the cross sections set in Step S19030 from the respective three-dimensional images obtained in Step S19000 to generate the individual cross-sectional images. Then, the cross-sectional image generating unit 1810 transmits each of the generated cross-sectional images to each of the target position obtaining unit 1812 and the display controlling unit 1816.

In Step S19050, the display controlling unit 1816 performs control for displaying each of the cross-sectional images generated in Step S19040 in an arrangement on the display 172. At this time, when the target position and the corresponding position have been obtained in the process at the subsequent stage, the display controlling unit 1816 adjusts the respective display positions of the cross-sectional images generated in Step S19040 such that the target position and the corresponding position coincide with each other on the display 172.

Specifically, first, the cross-sectional image of the second three-dimensional image is displayed such that the target position in the cross-sectional image of the second three-dimensional image is the same as a projection position calculated in Step S19090 described later.

Next, when the individual cross-sectional images are displayed in a lateral arrangement, the cross-sectional image of the first three-dimensional image is translated in a vertical direction to be displayed such that target position in the second three-dimensional image coincides with the corresponding position in the first three-dimensional image in the vertical direction on the display 172.

On the other hand, when the individual cross-sectional images are displayed in a vertical arrangement, the cross-sectional image of the first three-dimensional image is translated in the lateral direction to be displayed such that the target position in the second three-dimensional image coincides with the corresponding position in the first three-dimensional image in the lateral direction on the display 172.

Note that, when the respective display regions of the cross-sectional images are set on the display 172, the cross-sectional image of the first three-dimensional image may be translated appropriately to be displayed such that the respective coordinates of the target point and the corresponding point in the coordinate system in each of the display regions match each other.

In Step S19080, the image processing apparatus 1800 determines whether or not to specify the target position. For example, the result of the determination about a change is input depending on whether or not the user has operated a mouse not shown and located a mouse cursor to a position within a predetermined distance from any one of the set of known points in the second three-dimensional image. When an input indicative of a change is received, the process is advanced to Step S19090. On the other hand, when an input indicative of a change is not received, the process is advanced to Step S19110.

In Step S19090, the target position obtaining unit 1812 specifies a position on the cross-sectional image of the second three-dimensional image on the basis of the information input by a user's operation, determines the target position on the basis of the specified position, and transmits the target position to each of the corresponding position obtaining unit 1814 and the cross section setting unit 1808.

In the present embodiment, when the three-dimensional distance from the known point to the cross section is within the predetermined distance, a figure (e.g., circle) representing the position of the known point is displayed at the position (projection position) of the intersection point of a perpendicular line extending from the known point to the cross section with the cross section. When the user clicks the button of the mouse not shown while referencing the display of the figure to specify the position on the cross-sectional image, the closest one of the set of known points on the second three-dimensional image which are located within the predetermined distance (which is the three-dimensional distance herein) from the specified position is selected as the target point. The position of the selected target point is set as the target position.

Note that the predetermined distance described above is not limited to the three-dimensional distance. For example, the predetermined distance may also be a distance (two-dimensional distance on the cross section) from the projection position (position of the intersection point of the perpendicular line extending from the known point to the cross section with the cross section) to the specified position.

In Step S19100, the corresponding position obtaining unit 1814 obtains the corresponding position on the first three-dimensional image which corresponds to the target position calculated in Step S18090 and transmits the obtained corresponding position to the cross section setting unit 1808. Specifically, the corresponding position obtaining unit 1814 obtains the position of the corresponding point on the first three-dimensional image which corresponds to the target point on the second three-dimensional image from the information on the sets of known points and sets the obtained position as the corresponding position.

Thus, in Embodiment 5, when one of the points in the sets of corresponding known points is specified as the target position, the cross-sectional image including the position (target position) of the target point is generated from the second three-dimensional image, while the cross-sectional image including the position (corresponding position) of the corresponding point which corresponds to the target point is generated from the first three-dimensional image. This allows the user to easily compare the cross-sectional images of the two three-dimensional images including the corresponding point to each other.

Note that the corresponding points are not limited to those used for registration. The corresponding points may be any corresponding point set in the images. It may also be possible that the corresponding points are not obtained from the server, but are specified on the cross-sectional images by the user.

In the present embodiment, the case where the first and second three-dimensional images are displayed in an arrangement has been described by way of example. However, the display of the first and second three-dimensional images is not limited thereto. It may also be possible that the first and second deformed images are generated and displayed in an arrangement in the same manner as in Embodiment 1. When the individual cross-sectional images are displayed in an arrangement as shown in FIG. 3, the cross-sectional image of the first three-dimensional image, the cross-sectional image (first deformed cross-sectional image) of the first deformed image, and the cross-sectional image (second deformed cross-sectional image) of the second deformed image are preferably translated and displayed so as to satisfy the following four conditions which are:

the target position in the second three-dimensional image should coincide with the corresponding position in the second deformed image in the vertical direction on the display;

the target position in the first deformed image should coincide with the corresponding position in the first three-dimensional image in the vertical direction on the display;

the target position in the second three-dimensional image should coincide with the corresponding position in the first deformed image in the lateral direction on the display; and the target position in the first deformed image should coincide with the corresponding position in the second three-dimensional image in the lateral direction on the display.

On the other hand, when the individual cross-sectional images are displayed in an arrangement as shown in FIG. 5, the cross-sectional image of the first three-dimensional image, the cross-sectional image of the first deformed image, and the cross-sectional image of the second deformed image are preferably translated and displayed so as to satisfy the following four conditions which are:

the target position in the second three-dimensional image should coincide with the corresponding position in the second deformed image in the lateral direction on the display;

the target position in the first deformed image should coincide with the corresponding position in the first three-dimensional image in the lateral direction on the display;

the target position in the second three-dimensional image should coincide with the corresponding position in the first deformed image in the vertical direction on the display; and the target position in the first deformed image should coincide with the corresponding position in the second three-dimensional image in the vertical direction on the display.

Other Embodiments

The present invention can also be implemented by a computer (or a device such as a CPU or MPU) in a system or an apparatus which implements the functions of the embodiments described above by reading and executing the program recorded in a storage device. The present invention can also be implemented by a method including steps to be performed by a computer in a system or an apparatus which implements the functions of the embodiments described above by reading and executing the program recorded in a storage device. The present invention can also be implemented by a circuit (e.g., ASIC) which implements one or more functions. For this purpose, the foregoing program is provided from various types of recording media (i.e., computer-readable recording media which non-transitorily hold data) which can serve as the foregoing storage device to the foregoing computer through, e.g., a network. Accordingly, any of the foregoing computer (including a device such as a CPU or MPU), the foregoing method, the foregoing program (including a program code and a program product), and the computer-readable recording medium which non-transitorily holds the foregoing program is included in the category of the present invention.

The information processing apparatus in each of the embodiments described above may be implemented as a single apparatus or may also be in a form in which a plurality of apparatus are combined to be communicative with each other to perform the processes described above. In either case, the apparatus is included in the embodiments of the present invention. The processes described above may also be performed by a common server device or a group of servers. It is sufficient for the plurality of units included in the information processing apparatus and the information processing system to be communicative at a predetermined communication rate. The plurality of units included in the information processing apparatus and the information processing system need not be present in the same facility or the same country.

The embodiments of the present invention include a form in which a software program which implements the functions of the embodiments described above is supplied to a system or an apparatus and a computer in the system or apparatus reads the code of the supplied program and executes the program.

Accordingly, the program code installed in the computer to cause the computer to perform the processes according to the embodiments is also one of the embodiments of the present invention. The functions of the embodiments described above can also be implemented by a part or the whole of an actual process which is performed by an OS operating in a computer or the like on the basis of the instructions included in the program read by the computer.

A form in which the embodiments described above are combined appropriately is also included in the embodiments of the present invention.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-141220, filed on Jul. 19, 2016, which is hereby incorporated by reference herein in its entirety.

What is claimed is:

1. An image processing apparatus comprising:
a memory storing a program; and
one or more processors which, by executing the program, function as units comprising:
(1) an image obtaining unit configured to obtain a first image and a second image different from the first image;
(2) a deformation information obtaining unit configured to obtain deformation information representing deformation between the first image and the second image;
(3) a deformed image generating unit configured to generate a first deformed image of the first image deformed in accordance with the second image and a second deformed image of the second image deformed in accordance with the first image, on the basis of the deformation information; and (4) a display controlling unit configured to control simultaneous display, on a displaying unit, of (a) the first image, (b) the second image, (c) the first deformed image, and (d) the second deformed image, in an arrangement.

2. The image processing apparatus according to claim 1, wherein an image in which the first deformed image is superimposed on the second image, or a differential image is generated based on the second image and the first deformed image, and wherein an image in which the second deformed image is superimposed on the first image, or a differential image is generated based on the first image and the second deformed image.

3. The image processing apparatus according to claim 1, wherein the display controlling unit is configured to display the first image, the second image, the first deformed image, and the second deformed image on the displaying unit simultaneously or in a switching manner by a predetermined number at a time.

4. The image processing apparatus according to claim 1, wherein the deformation information shows a correspondence in a shape of an object between the first image and the second image.

5. The image processing apparatus according to claim 4, wherein the deformation information is information on a deformation field including displacement vectors from the positions of the individual unit regions of the second image to the corresponding positions on the first image.

6. The image processing apparatus according to claim 4, wherein the deformed image generating unit is configured to generate the first deformed image by deforming the object in the first image in accordance with a shape of the object in the second image and generate the second deformed image by deformation of the object in the second image in accordance with a shape of the object in the first image, based on the deformation information.

7. The image processing apparatus according to claim 1, wherein the display controlling unit is configured to arrange the first image, the second image, the first deformed image, and the second deformed image in a 2×2 tile-like manner in the displaying unit.

8. The image processing apparatus according to claim 7, wherein the display controlling unit is configured to arrange the first image and the second image diagonally in the displaying unit.

9. The image processing apparatus according to claim 1, wherein the first image and the second image are a three-dimensional image, and wherein the display controlling unit is configured to display, on the displaying unit, a cross-sectional image of a corresponding cross-section of the first image, the second image, the first deformed image, and the second deformed image.

10. The image processing apparatus according to claim 9, wherein the display controlling unit is configured to control a position to arrange the first image, the second image, the first deformed image, and the second deformed image on the displaying unit, in accordance with at least any of an orientation of the cross-sectional image for the object and the deformation information.

11. The image processing apparatus according to claim 9, further comprising an operating unit configured to receive an input from a user.

12. The image processing apparatus according to claim 11, wherein the deformed image generating unit is configured to change a position of the cross-sectional image, based on information input from the operating unit.

13. The image processing apparatus according to claim 11, wherein the deformed image generating unit is configured to obtain a target position in the first image and a corresponding position to the target position in the second image and generate the first deformed image and the second deformed image using information on the target position and the corresponding position, based on information input from the operating unit.

14. The image processing apparatus according to claim 13, wherein the display controlling unit is configured (a) to superimpose information showing the target position on the first image and the second deformed image and display the same, and, (b) to superimpose information showing the corresponding position on the second image and the first deformed image and display the same.

15. The image processing apparatus according to claim 11, wherein the display controlling unit is configured to switch between a plurality of display modes in which number and combination of images displayed simultaneously on the displaying unit differ, based on information input from the operating unit.

16. The image processing apparatus according to claim 1, wherein the first image and the second image are different in at least imaging modality or imaging time.

17. An image processing method comprising:
a step of obtaining a first image and a second image different from the first image;
a step of obtaining deformation information representing deformation between the first image and the second image;
a step of generating a first deformed image of the first image deformed in accordance with the second image and a second deformed image of the second image deformed in accordance with the first image, on the basis of the deformation information; and
a step of controlling simultaneous display of (a) the first image, (b) the second image, (c) the first deformed image, and (d) the second deformed image, in an arrangement.

18. A non-transitory computer readable medium storing a program causing a computer to execute an image processing method, the method comprising:
a step of obtaining a first image and a second image different from the first image;
a step of obtaining deformation information representing deformation between the first image and the second image;
a step of generating a first deformed image of the first image deformed in accordance with the second image and a second deformed image of the second image deformed in accordance with the first image, on the basis of the deformation information; and
a step of controlling simultaneous display of (a) the first image, (b) the second image, (c) the first deformed image, and (d) the second deformed image, in an arrangement.

19. An image processing apparatus comprising:
a memory storing a program; and
one or more processors which, by executing the program, function as units comprising:
(1) an image obtaining unit configured to obtain a plurality of images different from each other;

(2) a deformation information obtaining unit configured to obtain deformation information representing deformation between the plurality of images;
(3) a deformed image generating unit configured to generate a plurality of deformed images of the respective plurality of images deformed in accordance with other images, based on the deformation information; and
(4) a display controlling unit configured to control simultaneous display, on a displaying unit, of (a) the plurality of images and (b) an image based on the plurality of deformed images, in an arrangement.

20. The image processing apparatus according to claim 19, wherein the display controlling unit is configured to display, on the displaying unit, an i-th image in a diagonal position (i,i) of a tile-like arrangement, and, to display an image based on a deformed image of the i-th image deformed in accordance with a j-th image in a position (i,j) of the tile-like arrangement.

21. An image processing apparatus comprising:
a memory storing a program; and
one or more processors which, by executing the program, function as units comprising:
(1) an image obtaining unit configured to obtain a first image and a second image different from the first image;
(2) a deformation information obtaining unit configured to obtain deformation information representing deformation between the first image and the second image;
(3) a deformed image generating unit configured to generate a first deformed image of the first image deformed in accordance with the second image and a second deformed image of the second image deformed in accordance with the first image, on the basis of the deformation information; and
(4) a display controlling unit configured to control simultaneous display, on a displaying unit, of (a) a first composite image composed of the first image and the second deformed image, and (b) a second composite image composed of the first deformed image and the second image, in an arrangement.

* * * * *